US012704842B2

(12) United States Patent
Hasselgren et al.

(10) Patent No.: US 12,704,842 B2
(45) Date of Patent: Aug. 11, 2026

(54) QUANTIZING AUTOENCODERS IN A NEURAL NETWORK

(71) Applicant: NVIDIA Corporation, Santa Clara, CA (US)

(72) Inventors: Jon Hasselgren, Bunkeflostrand (SE); Jacob Munkberg, Skane (SE)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/654,351

(22) Filed: May 3, 2024

(65) Prior Publication Data

US 2025/0103049 A1 Mar. 27, 2025

Related U.S. Application Data

(63) Continuation of application No. 16/282,210, filed on Feb. 21, 2019, now Pat. No. 11,977,388.

(51) Int. Cl.

| | |
|---|---|
| ***G05B 13/02*** | (2006.01) |
| ***G05D 1/00*** | (2006.01) |
| ***G05D 1/227*** | (2024.01) |
| ***G05D 1/249*** | (2024.01) |
| ***G06N 3/02*** | (2006.01) |
| ***G06N 3/04*** | (2023.01) |

(Continued)

(52) U.S. Cl.

CPC ......... *G05D 1/0231* (2013.01); *G05B 13/027* (2013.01); *G05D 1/0088* (2013.01); *G05D 1/227* (2024.01); *G05D 1/249* (2024.01); *G06N 3/02* (2013.01); *G06N 3/04* (2013.01); *G06N 3/043* (2023.01); *G06N 3/045* (2023.01); *G06N 3/088* (2013.01)

(58) Field of Classification Search

CPC .................................................... G05B 13/027

See application file for complete search history.

(56) References Cited

U.S. PATENT DOCUMENTS

| | | | |
|---|---|---|---|
| 11,122,267 | B2 | 9/2021 | Park et al. |
| 2019/0354806 | A1 | 11/2019 | Chhabra et al. |

(Continued)

FOREIGN PATENT DOCUMENTS

| | | | |
|---|---|---|---|
| WO | 2020057000 | A1 | 3/2020 |

OTHER PUBLICATIONS

IEEE, "IEEE Standard 754-2008 (Revision of IEEE Standard 754-1985): IEEE Standard for Floating-Point Arithmetic," Aug. 29, 2008, 70 pages.

(Continued)

*Primary Examiner* — Anshul Sood

(74) *Attorney, Agent, or Firm* — Davis Wright Tremaine LLP

(57) ABSTRACT

The performance of a neural network is improved by applying quantization to data at various points in the network. In an embodiment, a neural network includes two paths. A quantization is applied to each path, such that when an output from each path is combined, further quantization is not required. In an embodiment, the neural network is an autoencoder that includes at least one skip connection. In an embodiment, the system determines a set of quantization parameters based on the characteristics of the data in the primary path and in the skip connection, such that both network paths produce output data in the same fixed point format. As a result, the data from both network paths can be combined without requiring an additional quantization.

20 Claims, 13 Drawing Sheets

(51) Int. Cl.

| | |
|---|---|
| ***G06N 3/043*** | (2023.01) |
| ***G06N 3/045*** | (2023.01) |
| ***G06N 3/088*** | (2023.01) |

(56) References Cited

U.S. PATENT DOCUMENTS

| | | | |
|---|---|---|---|
| 2020/0042877 | A1 | 2/2020 | Whatmough et al. |
| 2020/0151541 | A1 | 5/2020 | Meng et al. |
| 2020/0184318 | A1 | 6/2020 | Minezawa et al. |
| 2021/0213973 | A1 | 7/2021 | Pena et al. |

OTHER PUBLICATIONS

Nvidia, "Developer Zone CUDA Toolkit Documentation v10.0.130" Retrieved from, "https://docs.nvidia.com/cuda/archive/10.0/," Oct. 18, 2018, 1 page.

Warden, "Pete Warden's Blog," retrieved from https://petewarden.com/2016/05/03/how-to-quantize-neural-networks-with-tensorflow/, May 3, 2016, 14 pages.

First Signal
32-bit Floating Point

21mV base
32mV Range

Second Signal
32-bit Floating Point

27mV base
32mV Range 8-bit Fixed Point

21mV base
52mV Range

800

```
802  def quantize(x, q):
     return tf.fake_quant_with_min_max_vars(x, -q, q)

804  def conv2d(x, out_channel, qx=tf.Variable(...)):
             W = tf.Variable(...)
             b = tf.Variable(...)
             qw = tf.Variable(...)

             W = quantize(W, qw) # weight quantization
             res = tf.nn.conv2d(x, W, ...)
             res = tf.nn.bias_add(res, b )
             res = tf.nn.relu(res)
             res = quantize(res, qx) # activation quant
     return res

806  def autoencoder(x):
             # shared quantization variables
             qx0 = tf.Variable(...)
             qx1 = tf.Variable(...)
808          xq = quantize(x, qx0) # quantize input

810          # encoder
             prevLayer = conv1 = conv2d(xq, 32, qx1)
             prevLayer = pool1 = pool2d(prevLayer)

             prevLayer = conv2 = conv2d(prevLayer, 64)
             prevLayer = pool2 = pool2d(prevLayer)

812          # decoder
             prevLayer = conv3 = conv2d(prevLayer, 128, qx1)
             prevLayer = upsc3 = upscale(prevLayer)

             prevLayer = conc3 = concat(prevLayer, pool1)
             prevLayer = conv4 = conv2d(prevLayer, 32, qx0)
             prevLayer = upsc4 = upscale(prevLayer)

             prevLayer = conc4 = concat(prevLayer, xq)
             out = conv2d(prevLayer, 3)
     return out
```

FIG. 8

QUANTIZING AUTOENCODERS IN A NEURAL NETWORK

BACKGROUND

Neural networks are an important development in the field of computer programming. In various examples, neural networks are used to perform tasks such as image processing, image recognition, speech recognition, and character recognition. Neural networks maintain data in a set of nodes. In many examples, neural networks maintain this data in a floating point format during training operations. Operations on data in floating point format is, in general, more time consuming and burdensome than operations using simpler integer-based formats. Therefore, many neural networks use a process called quantization at various points in the network to convert data into an integer-based format (such as fixed point) that is more-easily processed by a computer processor.

BRIEF DESCRIPTION OF THE DRAWINGS

Various techniques will be described with reference to the drawings, in which:

FIG. 8 illustrates an example of code that implements a quantizing autoencoder with skip connections, in an embodiment;

DETAILED DESCRIPTION

Figure 1:
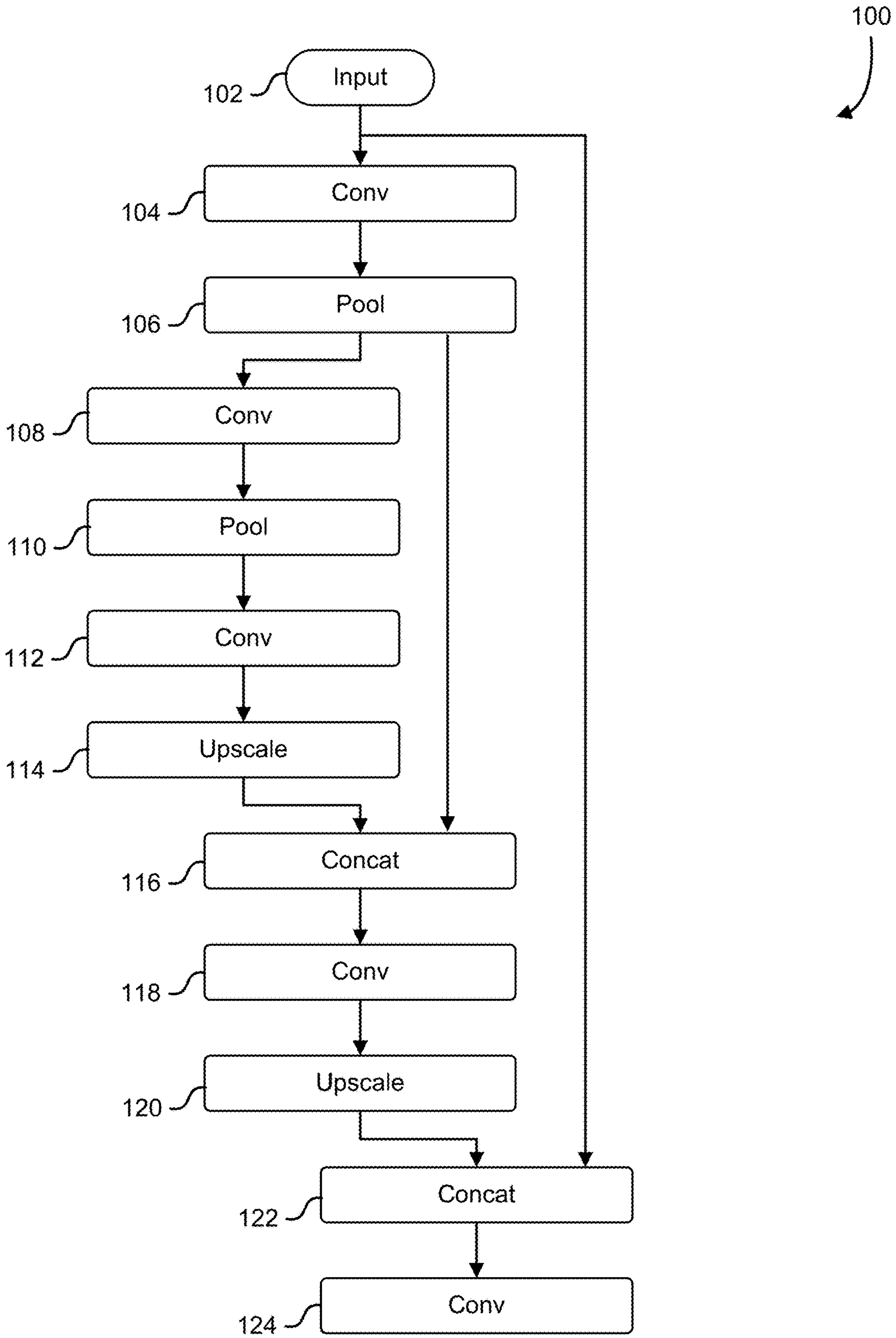
FIG. 1 illustrates an example of a neural network that implements an autoencoder with skip connections, in an embodiment.

The present document describes a system and method for applying quantization to a neural network. In an embodiment, the system analyzes the data processed by a plurality of paths through the neural network, and determines a quantization format for each path such that the outputs of the paths are able to be combined without further quantization operations. In an embodiment, a neural network that implements an autoencoder with skip connections combines the output of multiple paths using a concatenation operation. In an embodiment, the concatenation operation is an operation that generally requires that the inputs to the operation be in the same quantization format. In an embodiment, the system identifies a single set of quantization parameters that can be applied to two paths of the autoencoder neural network such that when the concatenation of the two paths is performed, neither path requires an additional quantization operation. In various embodiments, this produces a faster performing neural network that requires fewer quantization operations.

In an embodiment, neural network tools such as TensorFlow are used to implement quantization of data within a neural network. In an embodiment, generation of a network begins by training the network using 32-bit floating point precision. In an embodiment, once the desired level of training is achieved, the 32-bit floating point precision network is subsequently quantized by quantizing various weights and activations in the network to a desired precision, 8-bit integers for example, optionally followed by additional training, so called finetuning, to minimize the error introduced by the quantization operations. In an embodiment, the system determines quantization ranges at training time, and does not need to measure the ranges over a time period during normal operation to determine the ranges.

In an embodiment, the system constrains quantization during training and inference using 8-bit integer arithmetic for an autoencoder neural network with skip connections. In an embodiment, the system minimizes the number of re-quantization steps during inference which reduces the computational complexity of the neural network as a whole and leads to higher inference performance.

In an embodiment, the neural network includes a plurality of paths. In an embodiment, each path includes a number of operations that operate on data input into the neural network. In an embodiment, the data is quantized to reduce the size of the data and/or increase the speed with which the operations are able to be performed. In an embodiment, two or more of the plurality of paths converge and two or more path outputs are combined. In an embodiment, the combination is performed as a concatenation operation. In an embodiment, the combination is a residual concatenation operation. In an embodiment, quantization parameters for each path are chosen based at least in part on the data characteristics of all of the paths to be combined. For example, in an embodiment, the neural network is an autoencoder network with skip connections where two paths through the network are combined using a concatenation operation. In an embodiment, characteristics of the data through each path to be combined are examined so that a single common quantization format can be identified and applied to both paths. In an embodiment, the quantization format is defined by a range and resolution that is applied to an integer value. In an embodiment, by applying a common quantization format to both paths, when the output of the paths are combined, no additional quantization operations need be performed as they are already compatible and can be concatenated with each other in their present formats.

As one skilled in the art will appreciate in light of this disclosure, certain embodiments may be capable of achieving certain advantages, including some or all of the following: (1) improved inference performance of the neural network due to a reduced total number of quantization operations, and (2) a reduction in memory and processing requirements for the computer system due to the improved performance, (3) a corresponding reduction in system cost.

Figure 10:
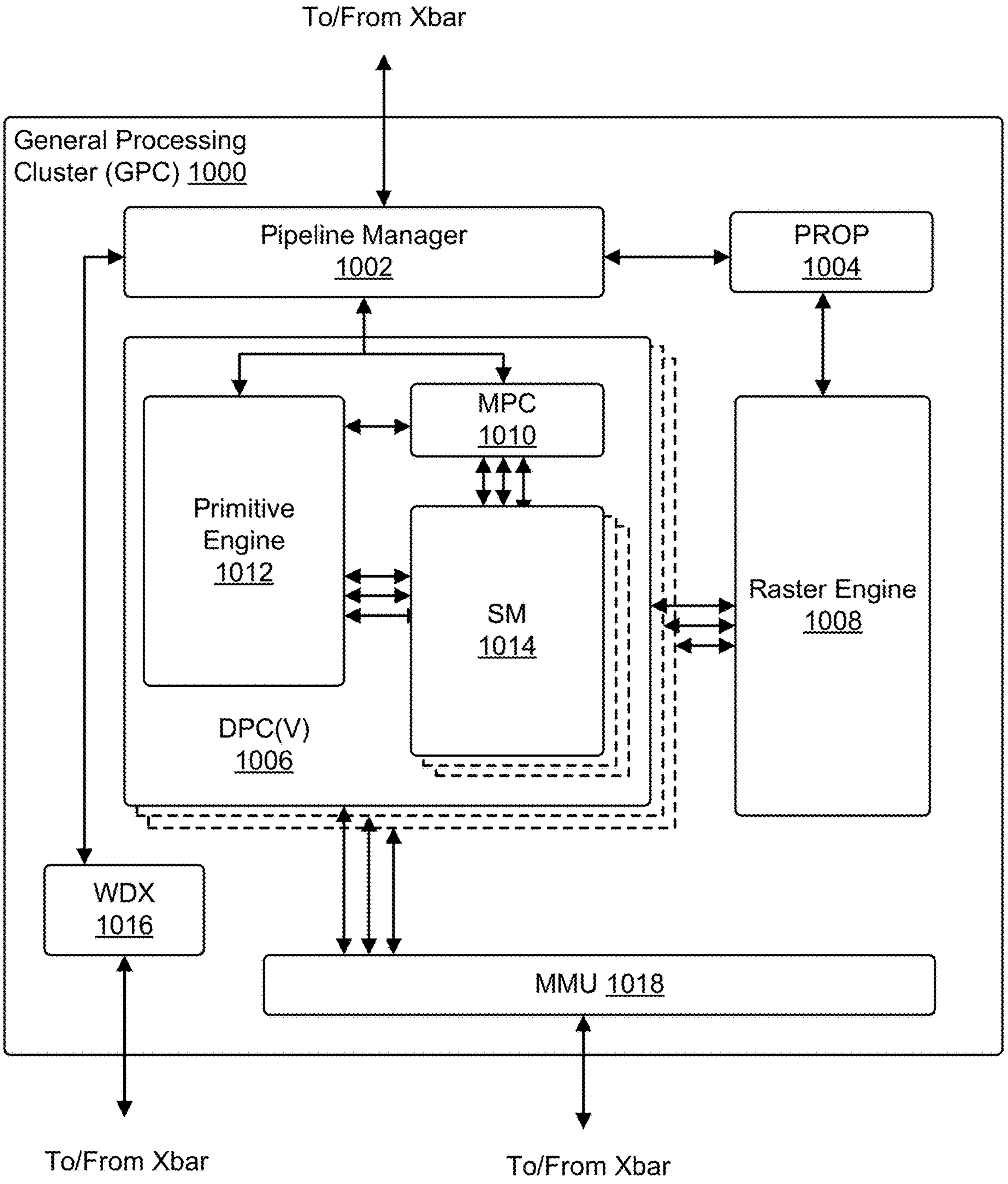
FIG. 10 illustrates an example of a general processing cluster ("GPC"), in accordance with one embodiment.
Figure 11:
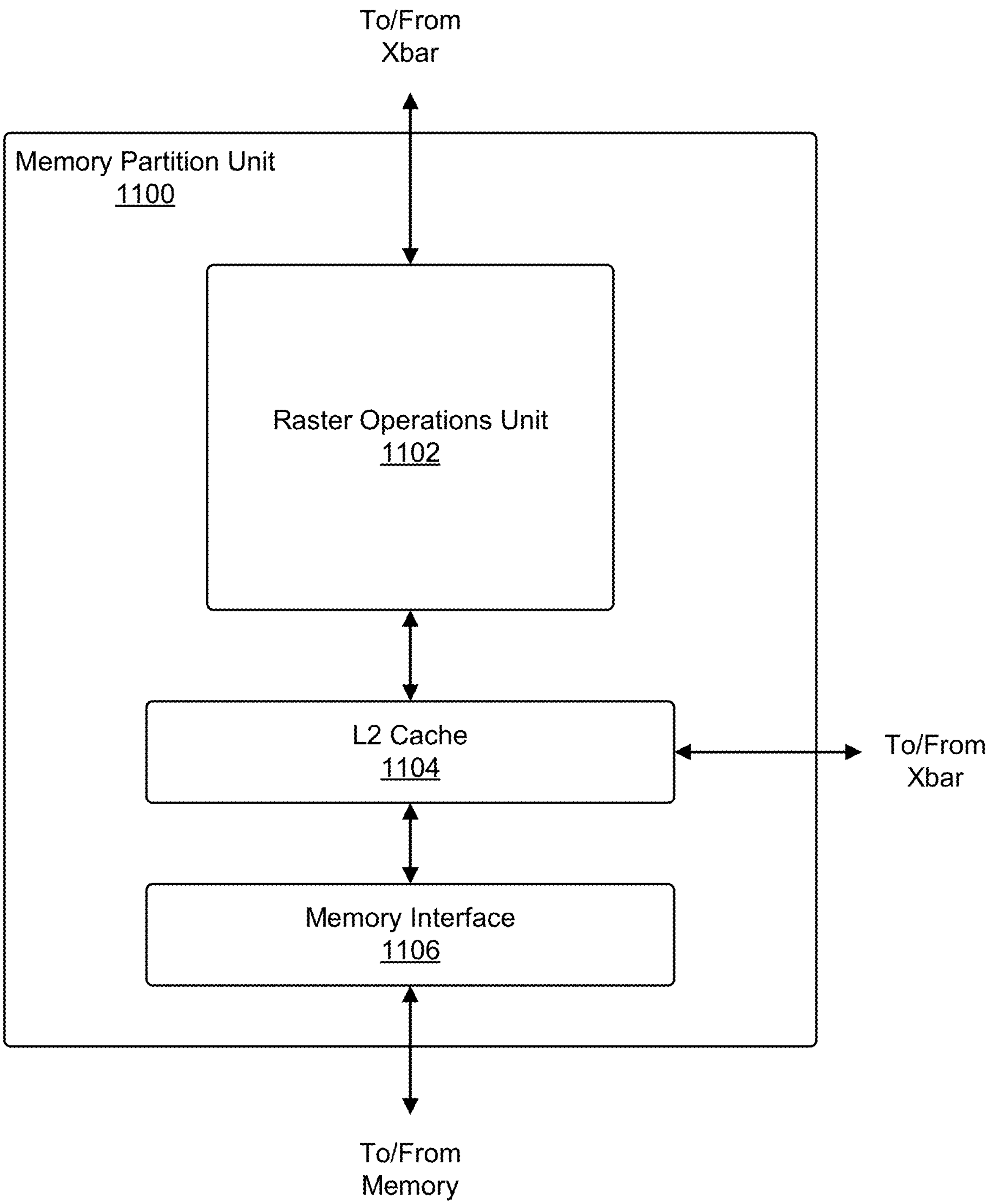
FIG. 11 illustrates an example of a memory partition unit, in accordance with one embodiment.

FIG. 1 illustrates an example of a neural network that implements an autoencoder with skip connections, in an embodiment. FIG. 1, in an embodiment, depicts an example 100 of the processes of an autoencoder with skip connections implemented by a neural network. In an embodiment, the example 100 can be performed by any suitable system, such as a computer system and/or graphics system. In an embodiment, a computer system can comprise one or more instances of a physical computing instance, such as a physical computer or device, or one or more instances of a virtual computing instance, such as a virtual machine, which can be hosted on one or more computer servers. Additionally, in an embodiment, a computer system can comprise various components and/or subsystems, such as one or more processors, memory storing instructions executable by the one or more processors, graphics subsystems, and/or variations thereof. In an embodiment, the computer system may be a PPU or GPC as shown in FIGS. 10 and 11 respectively.

In an embodiment, a graphics system is a graphics system that can exist on a computer system and/or other system to provide processing capabilities, specifically the processing of graphics through the usage of a graphics processing unit, although other processes can be performed by the graphics system. In an embodiment, a graphics system can be an integrated graphics system. In an embodiment, an integrated graphics system is a graphics system comprising memory shared with a processing unit of a system to perform and execute various processes. In an embodiment, a graphics system can be a discrete graphics system. A discrete graphics system, in an embodiment, is a graphics system comprising memory separate from memory utilized by a processing unit of a system. In an embodiment, a discrete graphics systems utilizes an independent source of video memory and/or other memory types to perform and execute processes.

In an embodiment, the input 102 to the autoencoder with skip connections process is a data signal. In an embodiment, the input 102 is a set of data, such as an image. In an embodiment, the image can be generated through the usage of one or more computer applications, or be captured as part of an image capture device such as a digital video camera, a web camera, a mobile telephone, and so on. Additionally, in an embodiment, the input 102 can be a data structure comprising data. Furthermore, in an embodiment, the input 102 can be a data signal such as an audio signal, video signal, analog signal, digital signal, and/or variations thereof. In an embodiment, the autoencoder is used to sharpen, enhance, or denoise an input image. In an embodiment, the processed image produced by the autoencoder in input into a vision-based control system such as an autonomous vehicle, robotic control system, or image recognition system. Various embodiments of the quantizing autoencoder may be used to process image data in systems that are battery powered or otherwise have limited processing capabilities. In an embodiment, the quantizing autoencoder may be used to process images on a mobile phone. Other variations are also considered as being within the scope of the present disclosure.

In an embodiment, the skip connections of the autoencoder refers to a process in which various output points of the autoencoder process bypass or "skip" various operations of the autoencoder process to be utilized as inputs to later points in the autoencoder process. For example, in an embodiment, the input 102 utilizes a skip connection process to bypass the operations of the autoencoder process to be input to the concatenation 122 process. In an embodiment, the skipping of the operations of the process results in the preservation of various details of the input 102. In an embodiment, these various details of the input 102 can be lost through various processes of the autoencoder process. In an embodiment, various details of the original representation of the input 102 are preserved by being input and concatenated with a more processed form of the input 102 that has undergone various processes of the autoencoder process.

In an embodiment, the input 102 is subject to the convolution 104, which comprises one or more convolution operations. In an embodiment, convolution is a mathematical operation on two inputs that produces an output that expresses how one input is affected by the other input. Additionally, in an embodiment, convolution can be applied to an input along with a filter, which can be denoted as a convolution filter. In an embodiment, convolution on an input with a filter can transform the input to enhance and/or reduce various features of the input. In an embodiment, the convolution operations of the example 100 can utilize one or more of the following convolution operations: 2D convolution, dilated convolution, separable convolution, and/or variations thereof. In an embodiment, 2D convolution comprises utilizing a filter or kernel that comprises a height and a width. In an embodiment, 2D convolution operates by filtering various portions of an input, which can be denoted as receptive fields. In an embodiment, 2D convolution generates feature maps in which various features of the input are identified. In an embodiment, dilated convolution comprises utilizing 2D convolution with additional parameters that can determine the dilation rate of the convolution. In an embodiment, dilated convolution increases the field of view of the filters the 2D convolution comprises by increasing the receptive fields of the filters. In an embodiment, separable convolution comprises separating a convolution operation into smaller convolution operations to reduce the number of parameters utilized.

In an embodiment, the result of the convolution 104 is input into the pooling 106, which comprises one or more pooling operations. In an embodiment, pooling is a form of non-linear down-sampling in which an input is transformed into a reduced representation of the input. In an embodiment, the produced reduced representation of the input can comprise various details of the original input, such as prominent details of the original input, which can include edges, certain patterns and/or features, and/or variations thereof. In an embodiment, the pooling operations of the example 100 can utilize one or more of the following types of pooling operations: average pooling, region of interest ("RoI") pooling, max pooling, and/or variations thereof. In an embodiment, average pooling comprises utilizing the averages of various regions of the input to produce a reduced representation of the input. In an embodiment, RoI pooling comprises determining various regions of the input, and utilizing max pooling on the determined regions. In an embodiment, max pooling comprises utilizing the max values of various regions of the input to produce a reduced representation of the input.

In an embodiment, the output of the pooling 106 utilizes a skip connection process to bypass the operations of the autoencoder process to be input to the concatenation 116 process. In an embodiment, like the skip connection process of the input 102, the "skipping" of the operations of the autoencoder process results in the preservation of various details of the output of the pooling 106. In an embodiment, these various details of the output of the pooling 106 can be lost through the additional remaining autoencoder processes.

In an embodiment, various details of the output of the pooling 106 are preserved by being input and concatenated with a more processed form of the output of the pooling 106, which can be the output of the upscale 114, which has undergone more processes of the autoencoder process.

Additionally, in an embodiment, the output of the pooling 106 is input into the convolution 108. In an embodiment, the convolution 108 is the same or different process as the convolution 104 as described in the preceding paragraphs. In an embodiment, the output of the convolution 108 is input into the pooling 110. In an embodiment, the pooling 110 is the same or different process as the pooling 106 as described in the preceding paragraphs. In an embodiment, the output of the pooling 110 is input into the convolution 112, which is the same or different process as the convolution 104.

In an embodiment, the output of the convolution 112 is utilized as an input to the upscale 114. In an embodiment, the upscale 114 comprises one or more upscale operations that upscales the input into an expanded representation of the input. In an embodiment, the one or more upscale operations can transform the input by expanding the data the input comprises, utilizing techniques such as resampling, interpolation, and/or variations thereof. In an embodiment, the upscale 114 expands the input by performing other various operations on the input, which comprises the output of the convolution 112, to produce a higher density approximation and/or expanded representation of the input. In an embodiment, the upscale 114 is utilized to restore various portions of the input comprising the output of the convolution 112 that have been reduced by the various pooling processes performed, such as the pooling 106 and pooling 110.

In an embodiment, the output of the upscale 114 and output of the pooling 106 are utilized as inputs to the concatenation 116. In an embodiment, the concatenation 116 comprises one or more concatenation operations, such as residual concatenation that concatenates the residual details of one input with the other input, which integrate the inputs together. In an embodiment, the one or more concatenation operations can integrate the inputs by performing one or more operations that merge the inputs together. In an embodiment, the concatenation 116 is done to integrate details from the output of the pooling 106 with the output of the upscale 114. In an embodiment, the output of the pooling 106 has undergone various processes to result in the output of the upscale 114. In an embodiment, these processes can result in the output of the upscale 114 lacking various details and/or features of the output of the pooling 106. In an embodiment, the concatenation 116 restores various details and/or features of the output of the upscale 114 by utilizing the output of the pooling 106 to mitigate the potentially lost various details and/or features.

In an embodiment, the output of the concatenation 116 is input into the convolution 118. In an embodiment, the convolution 118 is the same or different process as the convolution 104 as described in the preceding paragraphs. In an embodiment, the output of the convolution 118 is input into the upscale 120. In an embodiment, the upscale 120 is the same or different process as the upscale 114 as described in the preceding paragraphs. In an embodiment, the output of the upscale 120 and the input 102 are utilized as inputs to the concatenation 122. In an embodiment, the concatenation 122 is the same or different process as the concatenation 116 as described in the preceding paragraphs. In an embodiment, the concatenation 122 is done to integrate details from the output of the upscale 120 with the input 102. In an embodiment, the input 102 has undergone various processes to result in the output of the upscale 120. In an embodiment, these processes can result in the output of the upscale 120 lacking various details and/or features of the input 102. In an embodiment, the concatenation 122 restores various details and/or features of the output of the upscale 120 by utilizing input 102 to mitigate the potentially lost various details and/or features. In an embodiment, the output of the concatenation 122 is utilized as an input to the convolution 124, which is the same or different process as the convolution 104; the output of the convolution 124 is the output of the autoencoder with a skip connection process.

In an embodiment, the autoencoder with skip connections process depicted in FIG. 1 produces a representation of the input 102. In an embodiment, the autoencoder with skip connections process preserves the most pertinent and/or substantial features of the input 102, and generates an output representation that comprises these features. In an embodiment, the autoencoder with skip connections process removes various features of the input 102, and results in an output closely resembling the input 102. In an embodiment the output comprises the most pertinent and/or substantial features of the input 102. It should be noted that, in an embodiment, the autoencoder with skip connections process depicted in FIG. 1 can be utilized to produce other representations of the input 102, such as modified representations of the input and reconstructed representations of the input; other variations are also considered as being within the scope of the present disclosure.

Figure 2:
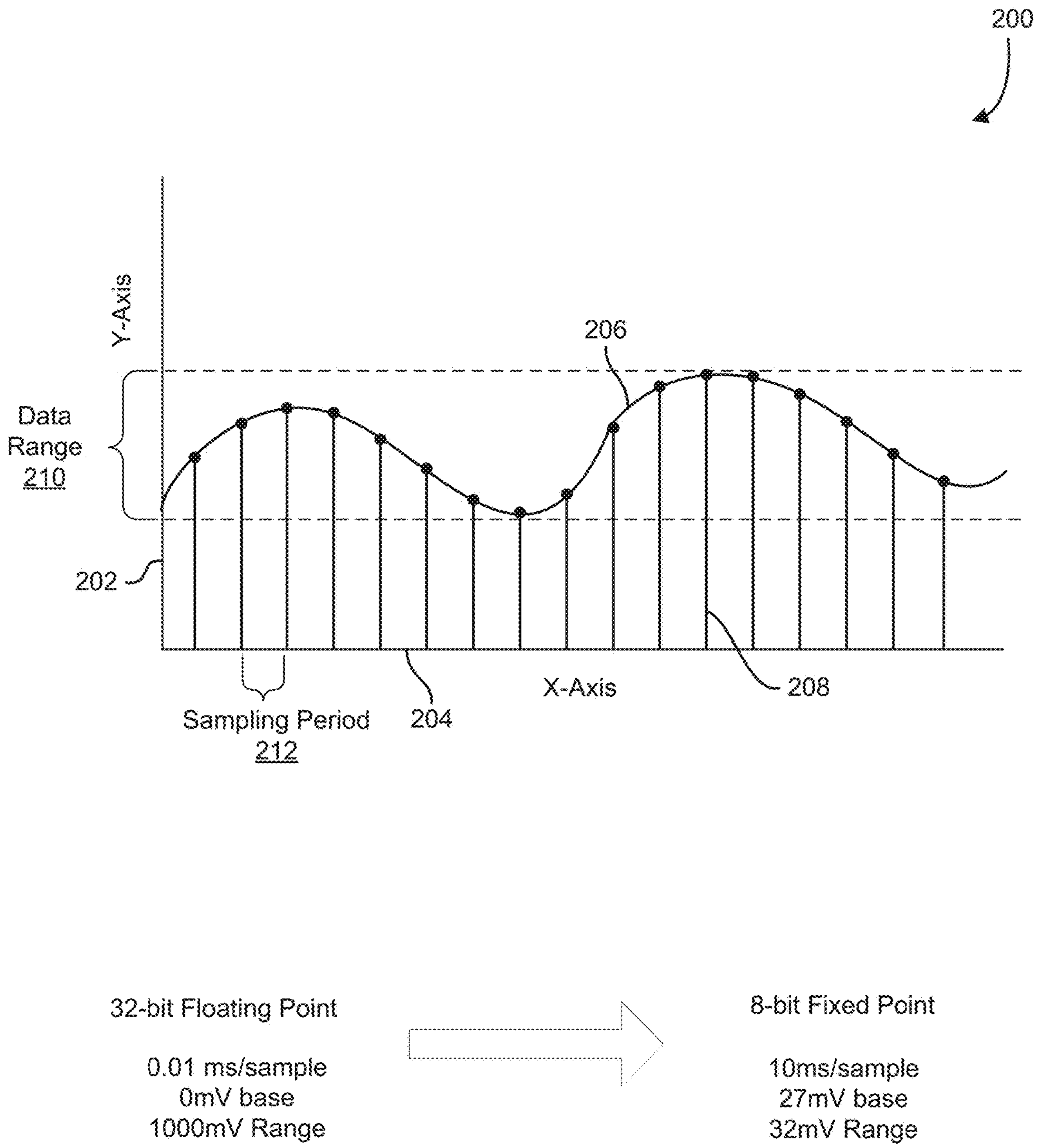
FIG. 2 illustrates an example of quantizing an input data signal, in an embodiment.

FIG. 2 illustrates an example of quantizing an input data signal, in an embodiment. FIG. 2, in an embodiment, depicts an example 200 of a quantization of an input data signal 206. In an embodiment, the input data signal 206 is depicted using a graphical representation. In an embodiment, the x-axis 204 corresponds to values of time with regards to the input data signal 206. In an embodiment, the x-axis 204 can be represented in seconds, milliseconds, and/or other variations thereof. In an embodiment, the y-axis 202 corresponds to values of amplitude with regards to the input data signal 206. In an embodiment, the y-axis can represent volts, millivolts, and/or other variations thereof.

In an embodiment, the input data signal 206 can be a data structure comprising data. In an embodiment, the input 206 can be a data signal such as an audio signal, video signal, analog signal, digital signal, and/or variations thereof; other variations are also considered as being within the scope of the present disclosure. In an embodiment, the quantization of the input data signal 206 can be performed by any suitable system, such as the system described in connection with FIG. 1. In an embodiment, the quantization of the input data signal 206 can be performed by a system such as a computer system and/or graphics system.

In an embodiment, a sampling period 212 is determined for the input data signal 206. In an embodiment, the sampling period 212 is the period in which samples are taken from the input data signal 206. In an embodiment, the sampling period 212 can determine the rate at which samples or values of the input data signal 206 are captured. In an embodiment, the samples captured can be used to construct a discrete and/or quantized representation of the input data signal 206. In an embodiment, the sampling period 212 can also be determined based on various criteria of the input data signal 206, such as desired quality, desired size, desired usage, and/or variations thereof.

In an embodiment, following the determination of the sampling period 212, the input data signal 206 can be sampled according to the sampling period 212 to identify samples 208 of the input data signal 206. In an embodiment, the samples 208 can form a high-fidelity discrete representation of the input data signal 206. Additionally or alternatively, in an embodiment, the samples 208 can form a reduced, low-fidelity discrete representation of the input data signal 206. In an embodiment, the fidelity of the representation can be dependent on the sampling period 212 determined for the input data signal 206. In an embodiment, a smaller sampling period results in more samples taken over a time interval, resulting in a higher-fidelity representation of the input data signal 206. In an embodiment, the samples that the samples 208 comprise correspond directly to the samples captured at the determined sampling period 212.

In an embodiment, the samples 208 captured at the sampling period 212 can be within a determined data range 210. In an embodiment, the data range 210 corresponds to the range of y-axis, or amplitude, values that the values of the input data signal 206 fall within. In an embodiment, the quantization of the input data signal 206 comprises a determination of a data range 210, sampling period 212, and base value. In an embodiment, the base value corresponds to the base value of the input data signal 206. In an embodiment, FIG. 2 depicts a base value of 27 mV. In an embodiment, the base value of 27 mV corresponds to a y-axis, or amplitude, value of 27 mV for the minimum value of the input data signal 206. In an embodiment, the quantization of the input data signal 206 results in a conversion of the representation of the values of the input data signal 206 into a reduced form. In an embodiment, FIG. 2 depicts the quantization of the input data signal 206 that results in a conversion of the original input data signal's representation utilizing 32-bit floating point values to a representation utilizing 8-bit fixed point values.

Figure 3:
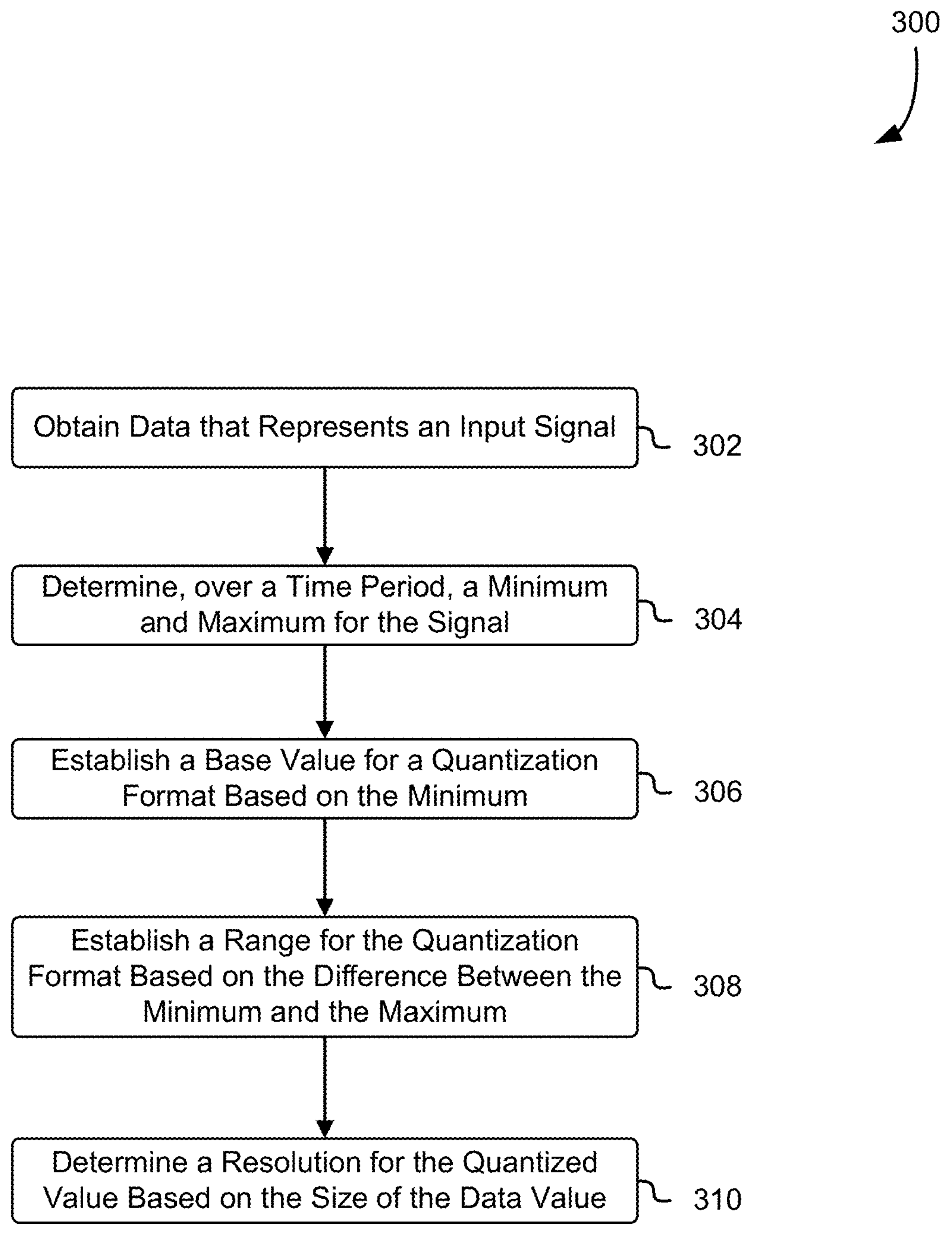
FIG. 3 illustrates an example of a process that, as a result of being performed by a computer system, determines a set of quantization parameters for an input signal, in an embodiment.

FIG. 3 illustrates an example of a process that, as a result of being performed by a computer system, determines a set of quantization parameters for in input signal, in an embodiment. In an embodiment, the system performing the process 300 obtains 302 data that represents an input signal. In an embodiment, the obtained data can comprise one or more data structures comprising data. Additionally, in an embodiment, the obtained data can be a data signal such as an audio signal, video signal, analog signal, digital signal, and/or variations thereof. In an embodiment, the system can obtain the data through various methods, such as through one or more computer applications, and/or variations thereof.

In an embodiment, the system performing the process 300 determines 304 over a time period, a minimum and maximum for the signal. In an embodiment, the system determines a minimum and maximum for the signal by analyzing the amplitude of the signal over a time period. In an embodiment, the amplitude of a signal refers to a measure of the values of the signal relative to a base value, and can utilize units of measurement such as volts and/or variations thereof. In an embodiment, the system analyzes amplitude values of the signal to determine the minimum and maximum values of the amplitude of the signal. In an embodiment, these values determine the minimum and maximum for the signal.

In an embodiment, the system performing the process 300 establishes 306 a base value for a quantization format based on the minimum. In an embodiment, the base value for a quantization format is determined based on the minimum determined for the signal. In an embodiment, the base value can be an approximate or exact value of the minimum determined for the signal.

In an embodiment, the system performing the process 300 establishes 308 a range for the quantization format based on the difference between the minimum and the maximum. In an embodiment, the system establishes the range by utilizing the minimum and the maximum determined from the signal. In an embodiment, the range can be an approximate or exact value of the difference between the determined minimum and maximum values.

In an embodiment, the system performing the process 300 determines 310 a resolution for the quantized value based on the size of the data value. In an embodiment, the resolution determined for the quantized value is determined by values of the data representing the input signal. In an embodiment, a resolution is determined for the quantized values such that the quantized values can represent the input signal. In an embodiment, the resolution is based on the size of the data values the input signal comprises. In an embodiment, the resolution can be based on various factors of the desired quantization of the data signal, such as desired quality, desired size, desired usage, and/or variations thereof. In an embodiment, the resolution is determined such that the quantized values based on the data values of the signal can represent the data values of the signal to a desired degree of accuracy.

Figure 4:
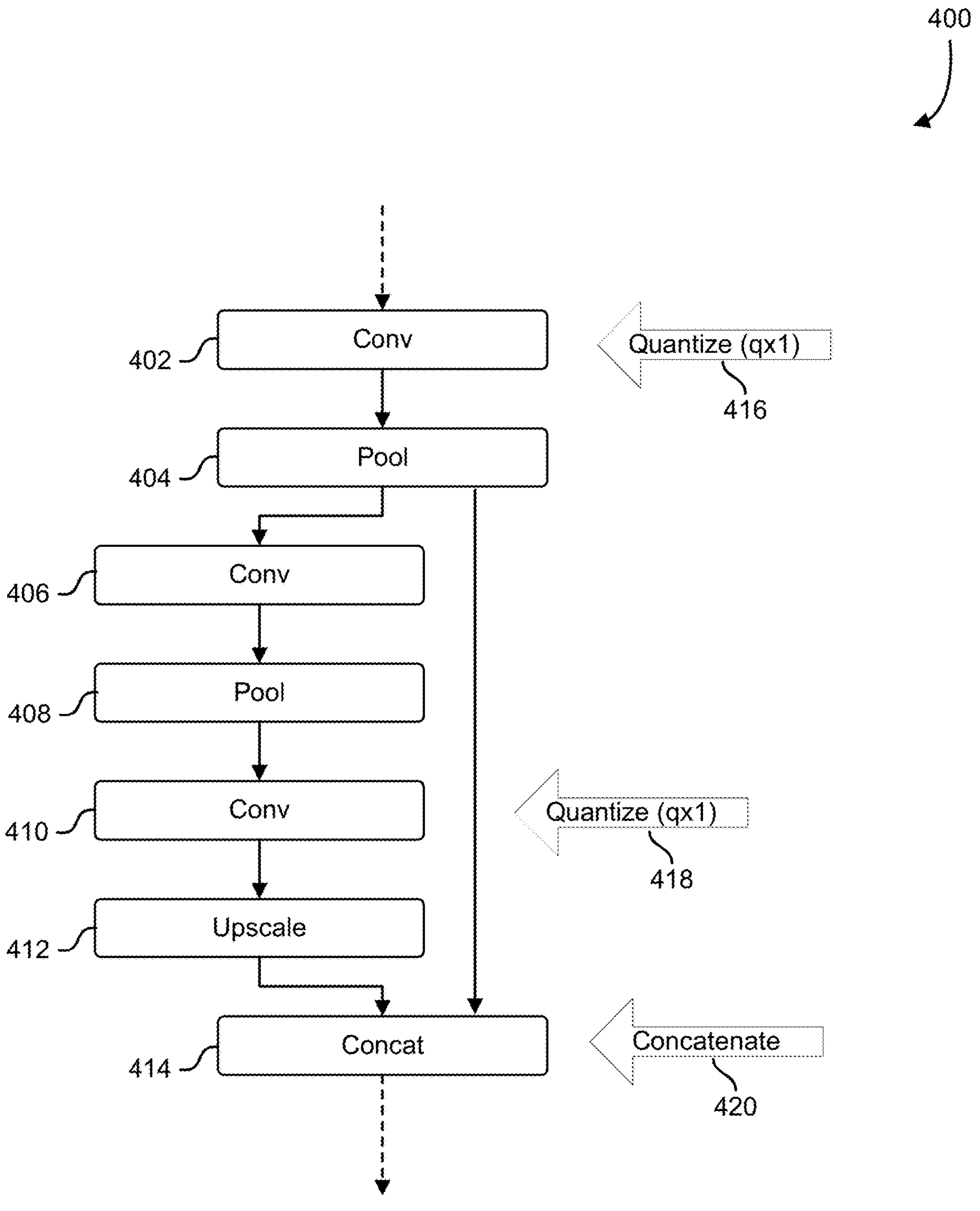
FIG. 4 illustrates an example of part of a neural network that implements an autoencoder, in which data being processed by the network is quantized, in an embodiment.

FIG. 4 illustrates an example of part of a neural network that implements an autoencoder, in which data being processed by the network is quantized in an embodiment. FIG. 4, in an embodiment, depicts an example 400 of a portion of a neural network that implements an autoencoder that additionally implements a quantization on the data being processed. In an embodiment, the example 400 begins with a convolution 402. In an embodiment, the convolution 402 comprises the same or different processes as the convolution 104 described in connection with FIG. 1. In an embodiment, the convolution 402 additionally comprises a quantization operation. In an embodiment, the convolution 402 performs the same or different processes as the convolution 104 described in connection with FIG. 1, with the addition of the quantize 416 operation.

In an embodiment, the convolution 402 comprises a quantization of the input to the convolution 402. In an embodiment, the input to the convolution 402 can be the same or different input as the input 102 described in connection with FIG. 1. In an embodiment, the input into the convolution 402 is analyzed to determine various characteristics of the quantization of the input, such as minimum, maximum, base value, range, and desired resolution. In an embodiment, the input is then quantized utilizing the determined characteristics to produce the quantized input. Further information regarding the quantization of an input can be found in the descriptions of FIG. 2 and FIG. 3.

In an embodiment, the output of the convolution 402 is input to the pooling 404. In an embodiment, the pooling 404 is the same or different process as the pooling 106 described in connection with FIG. 1. In an embodiment, the output of the pooling 404 utilizes a skip connection process to skip the operations of the autoencoder process to be input to the concatenation 414 process. In an embodiment, like the skip connection process of the input 102 described in connection with FIG. 1, the "skipping" of the operations of the process results in the preservation of various details of the output of the pooling 404. In an embodiment, these various details of the output of the pooling 404 can be lost through the additional remaining autoencoder processes. In an embodiment, various details of the output of the pooling 404 are preserved by being input and concatenated with a more processed form of the output of the pooling 404, which can be the output of the upscale 412, which has undergone more processes of the autoencoder process.

Additionally, in an embodiment, the output of the pooling 404 is input into the convolution 406. In an embodiment, the convolution 406 is the same or a different process as the convolution 104 described in connection with FIG. 1. In an embodiment, the output of the convolution 406 is into the pooling 408. In an embodiment, the pooling 408 is the same or different process as the pooling 404 as described in the preceding paragraphs. In an embodiment, the output of the pooling 408 is input to the convolution 410. In an embodiment, the convolution 410 is the same or different process as the convolution 402. In an embodiment, the convolution 410 performs the same or different processes as the convolution 104 described in connection with FIG. 1, with the addition of the quantize 418 operation.

In an embodiment, the convolution 410 comprises a quantization of the input to the convolution 410. In an embodiment, the input to the convolution 410 is the output of the pooling 408. In an embodiment, the output of the pooling 408 is analyzed to determine various characteristics of the output of the pooling 408, such as minimum, maximum, base value, range, and desired resolution. In an embodiment, the output of the pooling 408 is quantized utilizing the determined characteristics to produce the quantized output of the pooling 408. In an embodiment, the quantization performed in the convolution 410 utilizes the same resolution as the quantization performed in the convolution 402.

In an embodiment, the output of the convolution 410 is input to the upscale 412. In an embodiment, the upscale 412 is the same or a different process as upscale 114 described in connection with FIG. 1. In an embodiment, the output of the upscale 114 as well as the output of the pooling 404 are input to the concatenation 414. In an embodiment, the concatenation 414 comprises one or more concatenation operations, such as residual concatenation, that integrate the inputs together. In an embodiment, the one or more concatenation operations can integrate the inputs by performing one or more operations that merge the inputs together. In an embodiment, the concatenation 414 is done to integrate details from the output of the pooling 404 with the output of the upscale 412. In an embodiment, the output of the pooling 404 has undergone various processes to result in the output of the upscale 412. In an embodiment, these processes can result in the output of the upscale 412 lacking various details and/or features of the output of the pooling 404. In an embodiment, the concatenation 414 restores various details and/or features of the output of the upscale 412 by utilizing the output of the pooling 404 to mitigate the potentially lost various details and/or features.

Additionally, in an embodiment, the concatenation 414 can be performed without significant additional computation because the inputs to the concatenation 414 have been quantized to a similar or same resolution in the quantize 416 and quantize 418 operations. In an embodiment, no additional quantization operations need be performed to the inputs to the concatenation 414, which can comprise the output of the pooling 404 and output of the upscale 412, because the inputs are already compatible and can be concatenated 420 with each other in their present formats.

Figure 5:
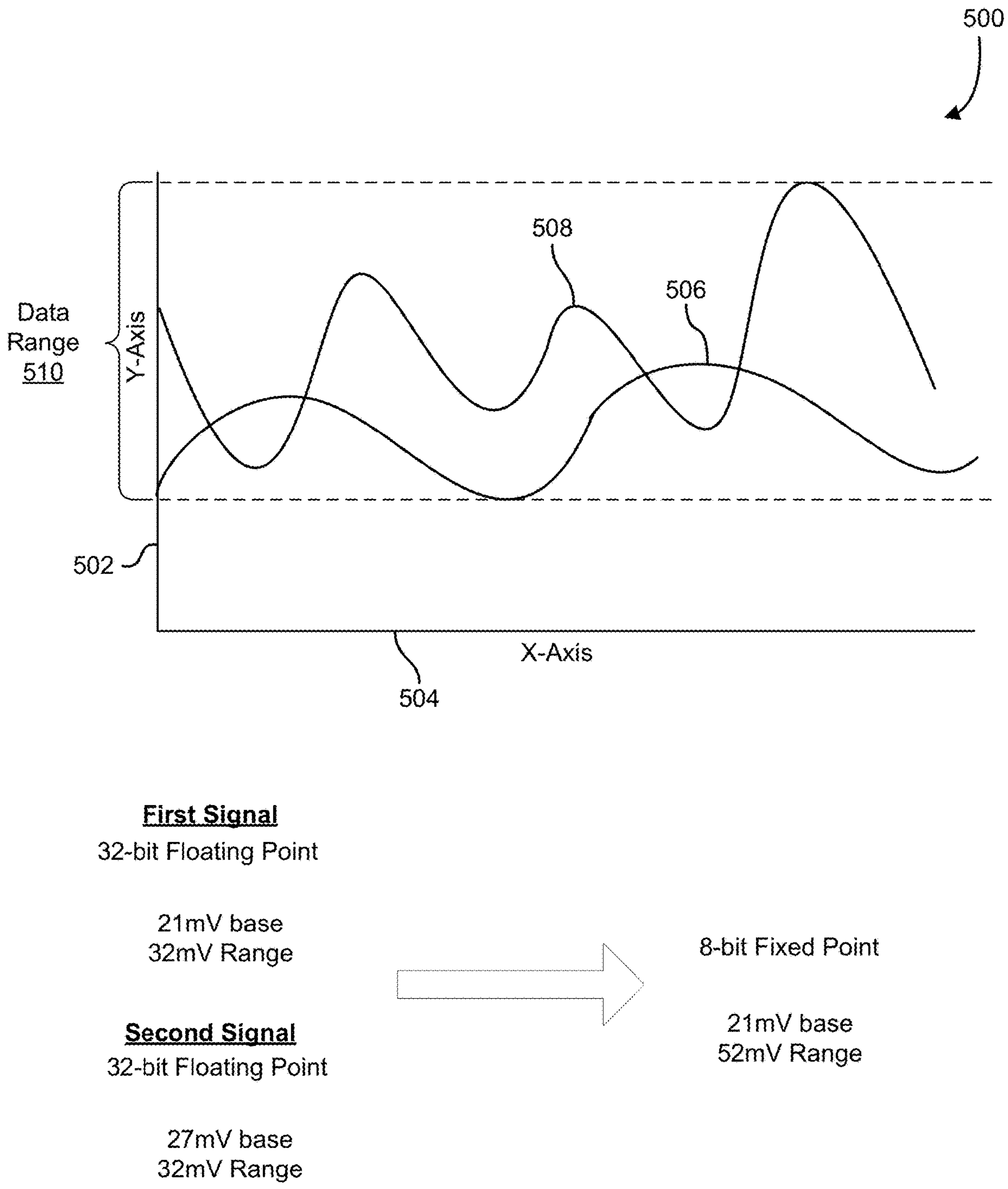
FIG. 5 illustrates an example of quantization parameters that is based at least in part on a plurality of data signals, in an embodiment.

FIG. 5 illustrates an example of quantization parameters that are based at least in part on a plurality of data signals, in an embodiment. FIG. 5, in an embodiment, depicts an example 500 of quantization parameters based on the data signal 506 and data signal 508. In an embodiment, the data signal 506 and data signal 508 are depicted using a graphical representation. In an embodiment, the x-axis 504 corresponds to values of time with regards to the data signal 506 and data signal 508. In an embodiment, the x-axis 504 can be represented in seconds, milliseconds, and/or other variations thereof. In an embodiment, the y-axis 502 corresponds to values of amplitude with regards to the data signal 506 and data signal 508. In an embodiment, the y-axis can be represented in volts, millivolts, and/or other variations thereof.

In an embodiment, the data signal 506 and data signal 508 can be data signals like the input 102 described in connection with FIG. 1. In an embodiment, the data signals can be data signals such as an audio signal, video signal, analog signal, digital signal, and/or variations thereof. In an embodiment, the quantization parameters can be determined for the data signal 506 and data signal 508 by any suitable system, such as the system described in connection with FIG. 1. In an embodiment, the determination of the quantization parameters of the data signal 506 and data signal 508 can be performed by a system such as a computer system and/or graphics system.

In an embodiment, the quantization parameters determined for the data signal 506 and data signal 508 comprise a resolution, base value, and range. In an embodiment, the quantization parameters can include other additional parameters. In an embodiment, the resolution can be based on various factors of the desired quantization of the data signals, such as desired quality, desired size, desired usage, and/or variations thereof. In an embodiment, the resolution is determined such that the quantized values based on the data values of the signals can represent the data values of the signals to a desired degree of accuracy. In an embodiment, the resolution is determined based on the size of the data signals. In an embodiment, the determined resolution for the data signal 506 and data signal 508 utilizes an 8-bit fixed point representation.

In an embodiment, the base value for the quantization is determined based on the minimum value of the data signal 506 and data signal 508. In an embodiment, the base value can be an approximate or exact value of the minimum value determined between the data signal 506 and data signal 508. In an embodiment, the base value determined is the minimum of the base values of the two data signals. In an embodiment, the base value is the minimum of 21 mV and 27 mV, resulting in a base value of 21 mV.

In an embodiment, range, or data range 510, for the quantization is determined based on the differences between the individual minimums and maximums of the data signal 506 and data signal 508. In an embodiment, the data range 510 can be an approximate or exact value of the difference between the determined smallest minimum and largest maximum between the data signal 506 and data signal 508. In an embodiment, the data range 510 comprises a value of 52 mV that represents the difference between the smallest minimum value of the data signal 506 and data signal 508 and the largest maximum value of the data signal 506 and data signal 508. In an embodiment, FIG. 5 depicts quantization parameters that are utilized in the quantization of the data signal 506 and data signal 508. In an embodiment, the quantization results in a conversion of the original data signals' representations utilizing 32-bit floating point values to representations utilizing 8-bit fixed point values.

Figure 6:
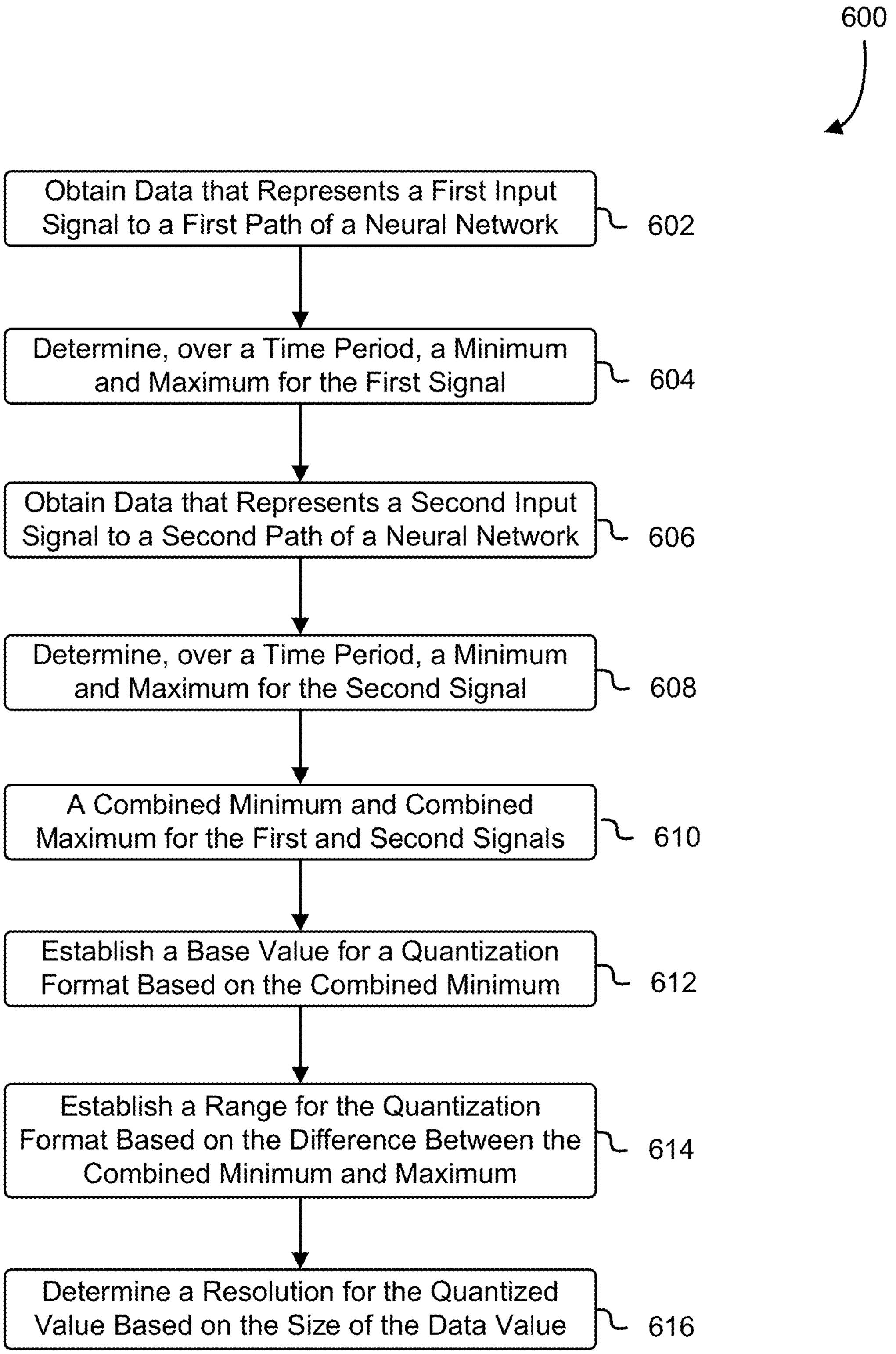
FIG. 6 illustrates an example of a process that, as a result of being performed by a computer system, determines a shared set of quantization parameters for two paths of a neural network, in an embodiment.

FIG. 6 illustrates an example of a process that, as a result of being performed by a computer system, determines a shared set of quantization parameters for two paths of a neural network, in an embodiment. In an embodiment, the system performing the process 600 obtains 602 data that represents a first input signal to a first path of a neural network. In an embodiment, the first input signal can be a data signal such as an audio signal, video signal, analog signal, digital signal, and/or variations thereof. In an embodiment, the system can obtain the data through one or more computer applications existing on the system and/or other system(s), or through other various methods. Additionally, in an embodiment, the neural network can be a neural network that comprises one or more operations, such as the various autoencoder processes described in connection with FIG. 1 and FIG. 4.

In an embodiment, the system performing the process 600 determines 604, over a time period, a minimum and maximum for the first signal. In an embodiment, the system determines a time period for the first signal. In an embodiment, the time period can any interval of time that comprises a portion of the first signal. In an embodiment, the system determines the minimum and maximum values of the first signal in the determined time period. In an embodiment, the minimum refers to the minimum amplitude value of the first signal. In an embodiment, the maximum refers to the maximum amplitude value of the first signal.

In an embodiment, the system performing the process 600 obtains 606 data that represents a second input signal to a second path of a neural network. In an embodiment, the second input signal can be a data signal such as an audio signal, video signal, analog signal, digital signal, and/or variations thereof. In an embodiment, the system can obtain the data through one or more computer applications existing on the system and/or other system(s), or through other various methods. Additionally, in an embodiment, the neural network can be a neural network like the neural network described in the preceding paragraphs. In an embodiment, the neural network comprises one or more operations, such as the various autoencoder processes described in connection with FIG. 1 and FIG. 4.

In an embodiment, the system performing the process 600 determines 608, over a time period, a minimum and maximum for the second signal. In an embodiment, the system determines a time period for the second signal. In an embodiment, the time period can be any interval of time comprising a portion of the second signal. In an embodiment, the time period is the same or different as the time period utilized for the first signal as described in the preceding paragraphs. In an embodiment, the system determines the minimum and maximum values of the second signal in the determined time period. In an embodiment, the minimum refers to the minimum amplitude value of the second signal. In an embodiment, the maximum refers to the maximum amplitude value of the second signal.

In an embodiment, the system performing the process 600 determines 610 a combined minimum and combined maximum for the first and second signals. In an embodiment, the system determines the combined minimum by comparing the determined minimums for the first and second signals. In an embodiment, the combined minimum is the minimum value of the determined minimums for the first and second signals. In an embodiment, the system determines the combined maximum by comparing the determined maximums for the first and second signals. In an embodiment, the combined maximum is the maximum value of the determined maximums for the first and second signals.

In an embodiment, the system performing the process 600 establishes 612 a base value for a quantization format based on the combined minimum. In an embodiment, the base value for the quantization format determines the base value of the quantization format. In an embodiment, the base value is an approximate or exact value of the combined minimum. In an embodiment, the system performing the process 600 establishes 614 a range for the quantization format based on the difference between the combined minimum and maximum. In an embodiment, the range for the quantization format is an exact or approximate value of the difference between the determined combined minimum and maximum of the first input signal and second input signal.

In an embodiment, the system performing the process 600 determines 616 a resolution for the quantized value based on the size of the data value. In an embodiment, the resolution determined for the quantized value is determined by values of the data representing the first input signal and second input signal. In an embodiment, a resolution is determined for the quantized values such that the quantized values can represent the first input signal and second input signal. In an embodiment, the resolution is based on the size of the data values the first and second input signals comprise. In an embodiment, the resolution can be based on various factors of the desired quantization of the first input signal and second input signal, such as desired quality, desired size, desired usage, and/or variations thereof. In an embodiment, the resolution is determined such that the quantized values based on the data values of the first input signal and second input signal can represent the data values of the first input signal and second input signal to a desired degree of accuracy.

Figure 7:
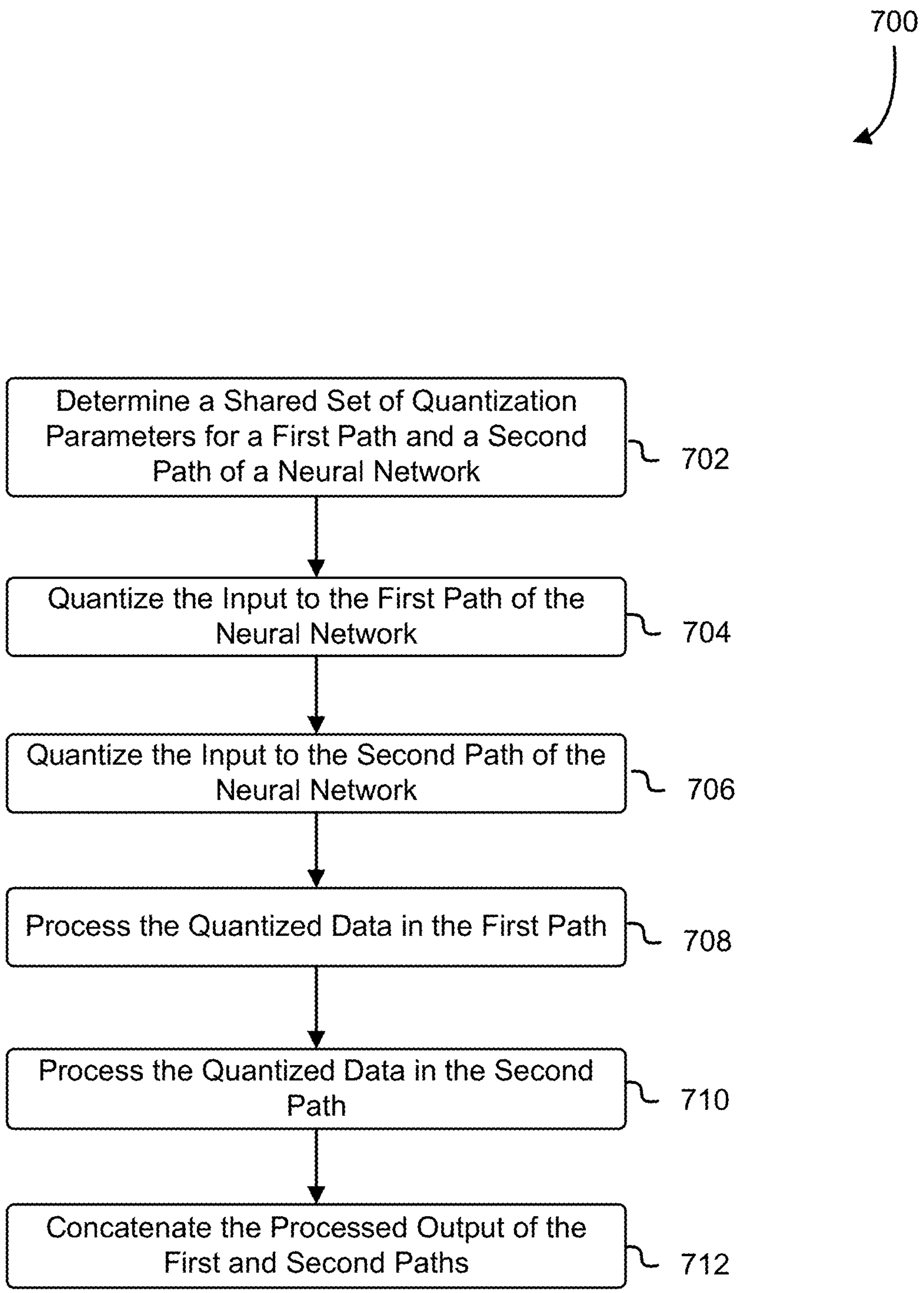
FIG. 7 illustrates an example of a process that, as a result of being performed by a computer system, applies a shared set of quantization parameters to two paths in a neural network, in an embodiment.

FIG. 7 illustrates an example of a process that, as a result of being performed by a computer system, applies a shared set of quantization parameters to two paths in a neural network, in an embodiment. In an embodiment, the system performing the process 700 determines 702 a shared set of quantization parameters for a first path and a second path of a neural network. In an embodiment, the system can determine the shared set of quantization parameters in a process such as the process 600 described in connection with FIG. 6. In an embodiment, the shared set of quantization parameters comprises a base value, range, resolution, and/or variations thereof determined from an input into a first path of a neural network and an input into a second path of a neural network. Additionally, in an embodiment, the neural network can be a neural network that comprises one or more operations, such as the various autoencoder processes described in connection with FIG. 1 and FIG. 4. It should be noted that, in various embodiments, the neural network can comprise any number of paths, in which a shared set of quantization parameters can be determined for the various paths.

In an embodiment, the system performing the process 700 quantizes 704 the input to the first path of the neural network. In an embodiment, the neural network can be a neural network like the neural network described in the preceding paragraphs, and can comprise one or more operations, such as the various autoencoder processes described in connection with FIG. 1 and FIG. 4. In an embodiment, the system quantizes the input to the first path by utilizing the determined quantization parameters. In an embodiment, the quantization of the input to the first path comprises mapping values of the input to the first path to another set of values. In an embodiment, various features of the mapping can be determined by the determined quantization parameters. In an embodiment, the quantization of the input to the first path can comprise generating a reduced representation of the values of the input to the first path.

In an embodiment, the system performing the process 700 quantizes 706 the input to the second path of the neural network. In an embodiment, the neural network can be a neural network like the neural network described in the preceding paragraphs, and can comprise one or more operations, such as the various autoencoder processes described in connection with FIG. 1 and FIG. 4. In an embodiment, the system quantizes the input to the second path by utilizing the determined quantization parameters. In an embodiment, the quantization of the input to the second path comprises mapping values of the input to the second path to another set of values. In an embodiment, various features of the mapping can be determined by the determined quantization parameters. In an embodiment, the quantization of the input to the second path can comprise generating a reduced representation of the values of the input to the second path.

In an embodiment, the system performing the process 700 processes 708 the quantized data in the first path. In an embodiment, the system processes the quantized data by utilizing the quantized data in the first path of the neural network. In an embodiment, the system performing the process 700 processes 710 the quantized data in the second path. In an embodiment, the system processes the quantized data by utilizing the quantized data in the second path of the neural network. In an embodiment, the first and second paths of the neural network can be the same or different as the two paths depicted from the output of the pooling 404 as described in connection with FIG. 4.

In an embodiment, the system performing the process 700 concatenates 712 the processed output of the first and second paths. In an embodiment, the concatenation comprises one or more concatenation operations, such as residual concatenation, that merge the inputs, which can comprise the processed output of the first and second paths of the neural network, together. In an embodiment, the concatenation can be performed without significant additional computation because the processed output of the first and second paths have been quantized to a similar or same resolution. In an embodiment, no additional quantization operations need be performed to the inputs to the concatenation, which comprise the processed output of the first and second paths of the neural network, because the inputs are already compatible and can be concatenated with each other in their present formats. Additionally, in various embodiments, the neural network can comprise any number of paths that have been quantized, in which the processed outputs of the various paths can be concatenated together.

FIG. 8 illustrates an example of code that implements a quantizing autoencoder with skip connections, in an embodiment. FIG. 8, in an embodiment, depicts an example 800 of computer code comprising an implementation of a quantizing autoencoder with skip connections. In an embodiment, the computer code depicted in example 800 is written in the Python programming language. In an embodiment, the computer code depicted in example 800 utilizes the TensorFlow software library. In an embodiment, the computer code depicted in example 800 can be written in programming languages such as Java, Scala, Python, Haskell, and/or variations thereof, and utilize one or more various software libraries. In an embodiment, the computer code depicted in example 800 can be executed by any suitable system, such as the system described in connection with FIG. 1. In an embodiment, the computer code depicted in example 800 can be executed by a system such as a computer system and/or graphics system. Additionally, in an embodiment, the computer code depicted in example 800 is a variation of an implementation of a neural network that implements an autoencoder, which additionally implements a quantization on the data being processed, as described in connection with FIG. 4.

In an embodiment, the computer code depicted in example 800 comprises three functions: quantize(x, q) 802, conv2d(x, out_channel, qx=tf.Variable( . . . )) 804, and autoencoder(x) 806. In an embodiment, the quantize(x, q) 802 function comprises operations that quantize the input denoted as "x." In an embodiment, the quantize(x, q) 802 function utilizes the input "x" as the input to be quantized according to the quantization parameters provided by the input "q." In an embodiment, the quantize(x, q) 802 function utilizes the TensorFlow function tf.fake_quant_with_min_max_vars to perform the quantization, although other various functions can be utilized.

In an embodiment, the conv2d(x, out_channel, qx=tf.Variable( . . . )) 804 function comprises various operations to perform a 2D convolution on the input denoted as "x." In an embodiment, 2D convolution comprises utilizing a filter or kernel that comprises a height and a width. In an embodiment, 2D convolution operates by filtering various portions of an input, which can be denoted as receptive fields. In an embodiment, 2D convolution generates feature maps in which various features of the input are identified. In an embodiment, the conv2d(x, out_channel, qx=tf.Variable( . . . )) 804 function comprises various TensorFlow functions such as tf.Variable, tf.nn.conv2d, tf.nn.bias_add, and tf.nn.relu to perform the 2D convolution, although other various functions can be utilized. In an embodiment, the result of the conv2d(x, out_channel, qx=tf.Variable( . . . )) 804 function is returned as the variable denoted as "res."

In an embodiment, the autoencoder(x) 806 function comprises various operations to perform an implementation of a quantizing autoencoder with skip connections. In an embodiment, the autoencoder(x) 806 function comprises a quantization 808 operation, which utilizes the quantize(x, q) 802 function, that is performed initially before the encoder 810 operation. In an embodiment, the quantization 808 operation is performed to quantize the input, which can be denoted as the variable "x", to the autoencoder(x) 806 function. In an embodiment, the quantization 808 operation is performed to reduce potential computational costs that can be incurred if quantization is performed at a later point in the autoencoder(x) 806 function. In an embodiment, the quantization 808 operation is performed such that the various data structures and/or data objects the autoencoder(x) 806 function comprises can be concatenated together without additional quantization.

In an embodiment, the autoencoder(x) 806 function comprises an encoder 810 operation. In an embodiment, the encoder 810 operation comprises various TensorFlow functions performing operations such as pooling and convolution to encode the input. Further information regarding the functionality of pooling and convolution can be found in the description of FIG. 1. In an embodiment, the autoencoder(x) 806 function comprises a decoder 812 operation. In an embodiment, the decoder 812 operation comprises various TensorFlow functions performing operations such as upscaling and concatenation to decode the encoded input. Further information regarding the functionality upscaling and concatenation can be found in the description of FIG. 1. In an embodiment, the encoder 810 operation comprises generating inputs to the decoder 812 operation. In an embodiment, the autoencoder(x) 806 function comprises a quantization operation 808 of the input, an encoder 810 operation, and a decoder 812 operation. In an embodiment, the autoencoder (x) 806 function utilizes these operations to preserve the most pertinent and/or substantial features of the input, and generate an output representation that comprises these features. In an embodiment, the output, which can be denoted as the variable "out", comprises the most pertinent and/or substantial features of the input. It should be noted that, in an embodiment, the autoencoder(x) 806 function can be utilized to produce other representations of the input, such as modified representations of the input and reconstructed representations of the input; other variations are also considered as being within the scope of the present disclosure.

Figure 9:
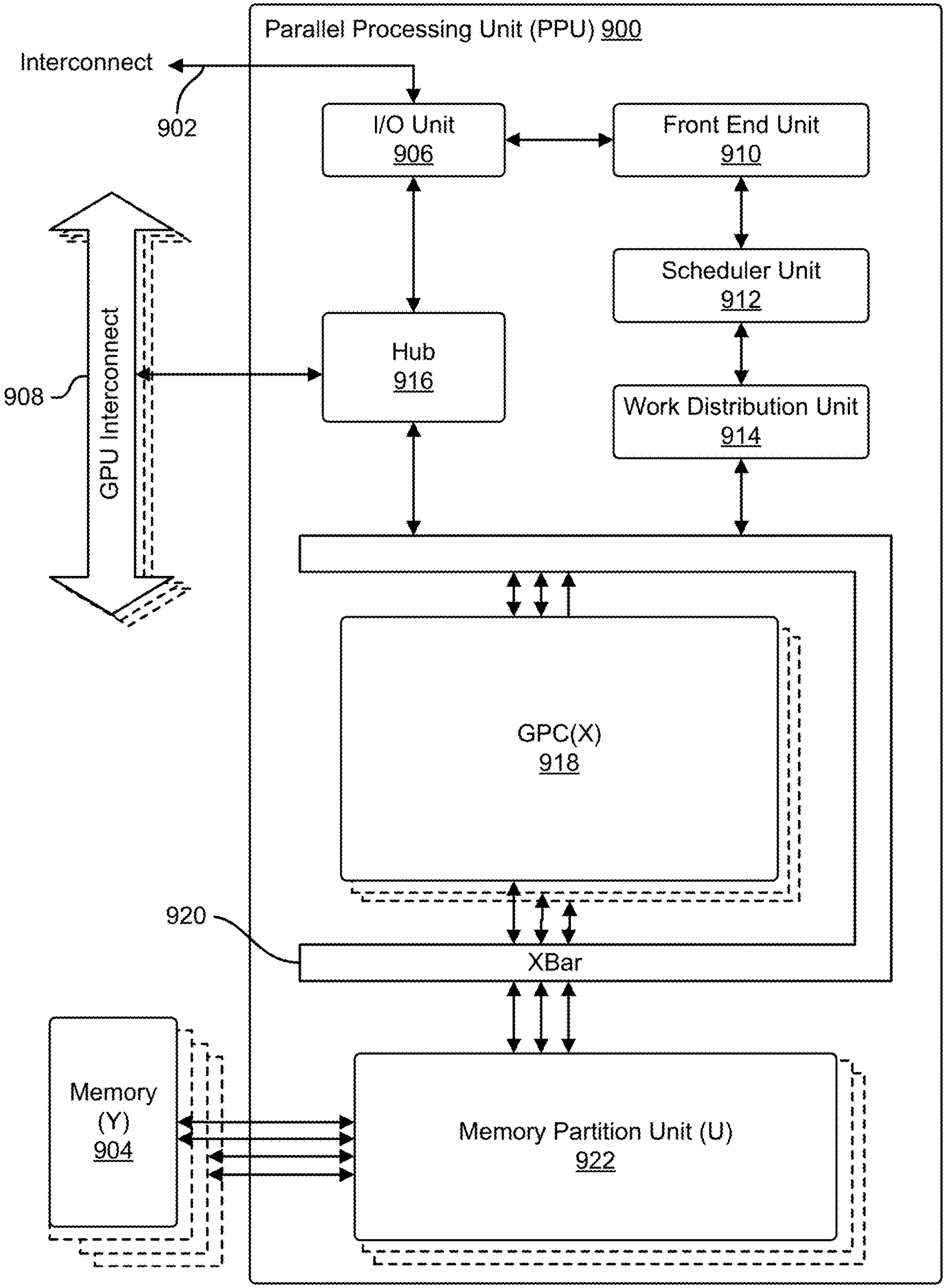
FIG. 9 illustrates an example of parallel processing unit ("PPU"), in accordance with an embodiment.

FIG. 9 illustrates a parallel processing unit ("PPU") 900, in accordance with one embodiment. In an embodiment, the PPU 900 is configured with machine-readable code that, if executed by the PPU, causes the PPU to perform some or all of processes and techniques described throughout this disclosure. In an embodiment, the PPU 900 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In an embodiment, a thread refers to a thread of execution and is an instantiation of a set of instructions configured to be executed by the PPU 900. In an embodiment, the PPU 900 is a graphics processing unit ("GPU") configured to implement a graphics rendering pipeline for processing three-dimensional ("3D") graphics data in order to generate two-dimensional ("2D") image data for display on a display device such as a liquid crystal display (LCD) device. In an embodiment, the PPU 900 is utilized to perform computations such as linear algebra operations and machine-learning operations. FIG. 9 illustrates an example parallel processor for illustrative purposes only and should be construed as a non-limiting example of processor architectures contemplated within the scope of this disclosure and that any suitable processor may be employed to supplement and/or substitute for the same.

In an embodiment, one or more PPUs are configured to accelerate High Performance Computing ("HPC"), data center, and machine learning applications. In an embodiment, the PPU 900 is configured to accelerate deep learning systems and applications including the following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In an embodiment, the PPU 900 includes an Input/Output ("I/O") unit 906, a front-end unit 910, a scheduler unit 912, a work distribution unit 914, a hub 916, a crossbar ("Xbar") 920, one or more general processing clusters ("GPCs") 918, and one or more partition units 922. In an embodiment, the PPU 900 is connected to a host processor or other PPUs 900 via one or more high-speed GPU interconnects 908. In an embodiment, the PPU 900 is connected to a host processor or other peripheral devices via an interconnect 902. In an embodiment, the PPU 900 is connected to a local memory comprising one or more memory devices 904. In an embodiment, the local memory comprises one or more dynamic random access memory ("DRAM") devices. In an embodiment, the one or more DRAM devices are configured and/or configurable as high-bandwidth memory ("HBM") subsystems, with multiple DRAM dies stacked within each device.

The high-speed GPU interconnect 908 may refer to a wire-based multi-lane communications link that is used by systems to scale and include one or more PPUs 900 combined with one or more CPUs, supports cache coherence between the PPUs 900 and CPUs, and CPU mastering. In an embodiment, data and/or commands are transmitted by the high-speed GPU interconnect 908 through the hub 916 to/from other units of the PPU 900 such as one or more copy engines, video encoders, video decoders, power management units, and other components which may not be explicitly illustrated in FIG. 9.

In an embodiment, the I/O unit 906 is configured to transmit and receive communications (e.g., commands, data) from a host processor (not illustrated in FIG. 9) over the system bus 902. In an embodiment, the I/O unit 906 communicates with the host processor directly via the system bus 902 or through one or more intermediate devices such as a memory bridge. In an embodiment, the I/O unit 906 may communicate with one or more other processors, such as one or more of the PPUs 900 via the system bus 902. In an embodiment, the I/O unit 906 implements a Peripheral Component Interconnect Express ("PCIe") interface for communications over a PCIe bus. In an embodiment, the I/O unit 906 implements interfaces for communicating with external devices.

In an embodiment, the I/O unit 906 decodes packets received via the system bus 902. In an embodiment, at least some packets represent commands configured to cause the PPU 900 to perform various operations. In an embodiment, the I/O unit 906 transmits the decoded commands to various other units of the PPU 900 as specified by the commands. In an embodiment, commands are transmitted to the front-end unit 910 and/or transmitted to the hub 916 or other units of the PPU 900 such as one or more copy engines, a video encoder, a video decoder, a power management unit, etc. (not explicitly illustrated in FIG. 9). In an embodiment, the I/O unit 906 is configured to route communications between and among the various logical units of the PPU 900.

In an embodiment, a program executed by the host processor encodes a command stream in a buffer that provides workloads to the PPU 900 for processing. In an embodiment, a workload comprises instructions and data to be processed by those instructions. In an embodiment, the buffer is a region in a memory that is accessible (e.g., read/write) by both the host processor and the PPU 900 the host interface unit may be configured to access the buffer in a system memory connected to the system bus 902 via memory requests transmitted over the system bus 902 by the I/O unit 906. In an embodiment, the host processor writes the command stream to the buffer and then transmits a pointer to the start of the command stream to the PPU 900 such that the front-end unit 910 receives pointers to one or more command streams and manages the one or more streams, reading commands from the streams and forwarding commands to the various units of the PPU 900.

In an embodiment, the front-end unit 910 is coupled to a scheduler unit 912 that configures the various GPCs 918 to process tasks defined by the one or more streams. In an embodiment, the scheduler unit 912 is configured to track state information related to the various tasks managed by the scheduler unit 912 where the state information may indicate which GPC 918 a task is assigned to, whether the task is active or inactive, a priority level associated with the task, and so forth. In an embodiment, the scheduler unit 912 manages the execution of a plurality of tasks on the one or more GPCs 918.

In an embodiment, the scheduler unit 912 is coupled to a work distribution unit 914 that is configured to dispatch tasks for execution on the GPCs 918. In an embodiment, the work distribution unit 914 tracks a number of scheduled tasks received from the scheduler unit 912 and the work distribution unit 914 manages a pending task pool and an active task pool for each of the GPCs 918. In an embodiment, the pending task pool comprises a number of slots (e.g., 32 slots) that contain tasks assigned to be processed by a particular GPC 918; the active task pool may comprise a number of slots (e.g., 4 slots) for tasks that are actively being processed by the GPCs 918 such that as a GPC 918 completes the execution of a task, that task is evicted from the active task pool for the GPC 918 and one of the other tasks from the pending task pool is selected and scheduled for execution on the GPC 918. In an embodiment, if an active task is idle on the GPC 918, such as while waiting for a data dependency to be resolved, then the active task is evicted from the GPC 918 and returned to the pending task pool while another task in the pending task pool is selected and scheduled for execution on the GPC 918.

In an embodiment, the work distribution unit 914 communicates with the one or more GPCs 918 via XBar 920. In an embodiment, the XBar 920 is an interconnect network that couples many of the units of the PPU 900 to other units of the PPU 900 and can be configured to couple the work distribution unit 914 to a particular GPC 918. Although not shown explicitly, one or more other units of the PPU 900 may also be connected to the XBar 920 via the hub 916.

The tasks are managed by the scheduler unit 912 and dispatched to a GPC 918 by the work distribution unit 914. The GPC 918 is configured to process the task and generate results. The results may be consumed by other tasks within the GPC 918, routed to a different GPC 918 via the XBar 920, or stored in the memory 904. The results can be written to the memory 904 via the partition units 922, which implement a memory interface for reading and writing data to/from the memory 904. The results can be transmitted to another PPU 900 or CPU via the high-speed GPU interconnect 908. In an embodiment, the PPU 900 includes a number U of partition units 922 that is equal to the number of separate and distinct memory devices 904 coupled to the PPU 900. A partition unit 922 will be described in more detail below in conjunction with FIG. 11.

In an embodiment, a host processor executes a driver kernel that implements an application programming interface ("API") that enables one or more applications executing on the host processor to schedule operations for execution on the PPU 900. In an embodiment, multiple compute applications are simultaneously executed by the PPU 900 and the PPU 900 provides isolation, quality of service ("QoS"), and independent address spaces for the multiple compute applications. In an embodiment, an application generates instructions (e.g., in the form of API calls) that cause the driver kernel to generate one or more tasks for execution by the PPU 900 and the driver kernel outputs tasks to one or more streams being processed by the PPU 900. In an embodiment, each task comprises one or more groups of related threads, which may be referred to as a warp. In an embodiment, a warp comprises a plurality of related threads (e.g., 32 threads) that can be executed in parallel. In an embodiment, cooperating threads can refer to a plurality of threads including instructions to perform the task and that exchange data through shared memory. Threads and cooperating threads are described in more detail, in accordance with one embodiment, in conjunction with FIG. 11.

FIG. 10 illustrates a GPC 1000 such as the GPC illustrated of the PPU 900 of FIG. 9, in accordance with one embodiment. In an embodiment, each GPC 1000 includes a number of hardware units for processing tasks and each GPC 1000 includes a pipeline manager 1002, a pre-raster operations unit ("PROP") 1004, a raster engine 1008, a work distribution crossbar ("WDX") 1016, a memory management unit ("MMU") 1018, one or more Data Processing Clusters ("DPCs") 1006, and any suitable combination of parts. It will be appreciated that the GPC 1000 of FIG. 10 may include other hardware units in lieu of or in addition to the units shown in FIG. 10.

In an embodiment, the operation of the GPC 1000 is controlled by the pipeline manager 1002. The pipeline manager 1002 manages the configuration of the one or more DPCs 1006 for processing tasks allocated to the GPC 1000. In an embodiment, the pipeline manager 1002 configures at least one of the one or more DPCs 1006 to implement at least a portion of a graphics rendering pipeline. In an embodiment, a DPC 1006 is configured to execute a vertex shader program on the programmable streaming multiprocessor ("SM") 1014. The pipeline manager 1002 is configured to route packets received from a work distribution to the appropriate logical units within the GPC 1000, in an embodiment, and some packets may be routed to fixed function hardware units in the PROP 1004 and/or raster engine 1008 while other packets may be routed to the DPCs 1006 for processing by the primitive engine 1012 or the SM 1014. In an embodiment, the pipeline manager 1002 configures at least one of the one or more DPCs 1006 to implement a neural network model and/or a computing pipeline.

The PROP unit 1004 is configured, in an embodiment, to route data generated by the raster engine 1008 and the DPCs 1006 to a Raster Operations ("ROP") unit in the memory partition unit, described in more detail above. In an embodiment, the PROP unit 1004 is configured to perform optimizations for color blending, organize pixel data, perform address translations, and more. The raster engine 1008 includes a number of fixed function hardware units configured to perform various raster operations, in an embodiment, and the raster engine 1008 includes a setup engine, a coarse raster engine, a culling engine, a clipping engine, a fine raster engine, a tile coalescing engine, and any suitable combination thereof. The setup engine, in an embodiment, receives transformed vertices and generates plane equations associated with the geometric primitive defined by the vertices; the plane equations are transmitted to the coarse raster engine to generate coverage information (e.g., an x, y coverage mask for a tile) for the primitive; the output of the coarse raster engine is transmitted to the culling engine where fragments associated with the primitive that fail a z-test are culled, and transmitted to a clipping engine where fragments lying outside a viewing frustum are clipped. In an embodiment, the fragments that survive clipping and culling are passed to the fine raster engine to generate attributes for the pixel fragments based on the plane equations generated by the setup engine. In an embodiment, the output of the raster engine 1008 comprises fragments to be processed by any suitable entity such as by a fragment shader implemented within a DPC 1006.

In an embodiment, each DPC 1006 included in the GPC 1000 comprises an M-Pipe Controller ("MPC") 1010; a primitive engine 1012; one or more SMs 1014; and any suitable combination thereof. In an embodiment, the MPC 1010 controls the operation of the DPC 1006, routing packets received from the pipeline manager 1002 to the appropriate units in the DPC 1006. In an embodiment, packets associated with a vertex are routed to the primitive engine 1012, which is configured to fetch vertex attributes associated with the vertex from memory; in contrast, packets associated with a shader program may be transmitted to the SM 1014.

In an embodiment, the SM 1014 comprises a programmable streaming processor that is configured to process tasks represented by a number of threads. In an embodiment, the SM 1014 is multi-threaded and configured to execute a plurality of threads (e.g., 32 threads) from a particular group of threads concurrently and implements a SIMD (Single-Instruction, Multiple-Data) architecture where each thread in a group of threads (e.g., a warp) is configured to process a different set of data based on the same set of instructions. In an embodiment, all threads in the group of threads execute the same instructions. In an embodiment, the SM 1014 implements a SIMT (Single-Instruction, Multiple Thread) architecture wherein each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. In an embodiment, execution state is maintained for each individual thread and threads executing the same instructions may be converged and executed in parallel for better efficiency. In an embodiment, the SM 1014 is described in more detail below.

In an embodiment, the MMU 1018 provides an interface between the GPC 1000 and the memory partition unit and the MMU 1018 provides translation of virtual addresses into physical addresses, memory protection, and arbitration of memory requests. In an embodiment, the MMU 1018 provides one or more translation lookaside buffers ("TLBs") for performing translation of virtual addresses into physical addresses in memory.

FIG. 11 illustrates a memory partition unit of a PPU, in accordance with one embodiment. In an embodiment, the memory partition unit 1100 includes a Raster Operations ("ROP") unit 1102; a level two ("L2") cache 1104; a memory interface 1106; and any suitable combination thereof. The memory interface 1106 is coupled to the memory. Memory interface 1106 may implement 32, 64, 128, 1024-bit data buses, or the like, for high-speed data transfer. In an embodiment, the PPU incorporates U memory interfaces 1106, one memory interface 1106 per pair of partition units 1100, where each pair of partition units 1100 is connected to a corresponding memory device. For example, PPU may be connected to up to Y memory devices, such as high bandwidth memory stacks or graphics double-data-rate, version 5, synchronous dynamic random access memory ("GDDR5 SDRAM").

In an embodiment, the memory interface 1106 implements an HBM2 memory interface and Y equals half U. In an embodiment, the HBM2 memory stacks are located on the same physical package as the PPU, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory supports Single-Error Correcting Double-Error Detecting ("SECDED") Error Correction Code ("ECC") to protect data. ECC provides higher reliability for compute applications that are sensitive to data corruption. Reliability is especially important in large-scale cluster computing environments where PPUs process very large datasets and/or run applications for extended periods.

In an embodiment, the PPU implements a multi-level memory hierarchy. In an embodiment, the memory partition unit 1100 supports a unified memory to provide a single unified virtual address space for CPU and PPU memory, enabling data sharing between virtual memory systems. In an embodiment the frequency of accesses by a PPU to memory located on other processors is trace to ensure that memory pages are moved to the physical memory of the PPU that is accessing the pages more frequently. In an embodiment, the high-speed GPU interconnect 908 supports address translation services allowing the PPU to directly access a CPU's page tables and providing full access to CPU memory by the PPU.

In an embodiment, copy engines transfer data between multiple PPUs or between PPUs and CPUs. In an embodiment, the copy engines can generate page faults for addresses that are not mapped into the page tables and the memory partition unit 1100 then services the page faults, mapping the addresses into the page table, after which the copy engine performs the transfer. In an embodiment, memory is pinned (i.e., non-pageable) for multiple copy engine operations between multiple processors, substantially reducing the available memory. In an embodiment, with hardware page faulting, addresses can be passed to the copy engines without regard as to whether the memory pages are resident, and the copy process is transparent.

Data from the memory of FIG. 9 or other system memory is fetched by the memory partition unit 1100 and stored in the L2 cache 1104, which is located on-chip and is shared between the various GPCs, in accordance with one embodiment. Each memory partition unit 1100, in an embodiment, includes at least a portion of the L2 cache 1060 associated with a corresponding memory device. In an embodiment, lower level caches are implemented in various units within the GPCs. In an embodiment, each of the SMs 1140 may implement a level one ("L1") cache wherein the L1 cache is private memory that is dedicated to a particular SM 1140 and data from the L2 cache 1104 is fetched and stored in each of the L1 caches for processing in the functional units of the SMs 1140. In an embodiment, the L2 cache 1104 is coupled to the memory interface 1106 and the XBar 920.

The ROP unit 1102 performs graphics raster operations related to pixel color, such as color compression, pixel blending, and more, in an embodiment. The ROP unit $$50, in an embodiment, implements depth testing in conjunction with the raster engine 1125, receiving a depth for a sample location associated with a pixel fragment from the culling engine of the raster engine 1125. In an embodiment, the depth is tested against a corresponding depth in a depth buffer for a sample location associated with the fragment. In an embodiment, if the fragment passes the depth test for the sample location, then the ROP unit 1102 updates the depth buffer and transmits a result of the depth test to the raster engine 1125. It will be appreciated that the number of partition units 1100 may be different than the number of GPCs and, therefore, each ROP unit 1102 can, in an embodiment, be coupled to each of the GPCs. In an embodiment, the ROP unit 1102 tracks packets received from the different GPCs and determines which that a result generated by the ROP unit 1102 is routed to through the Xbar.

Figure 12:
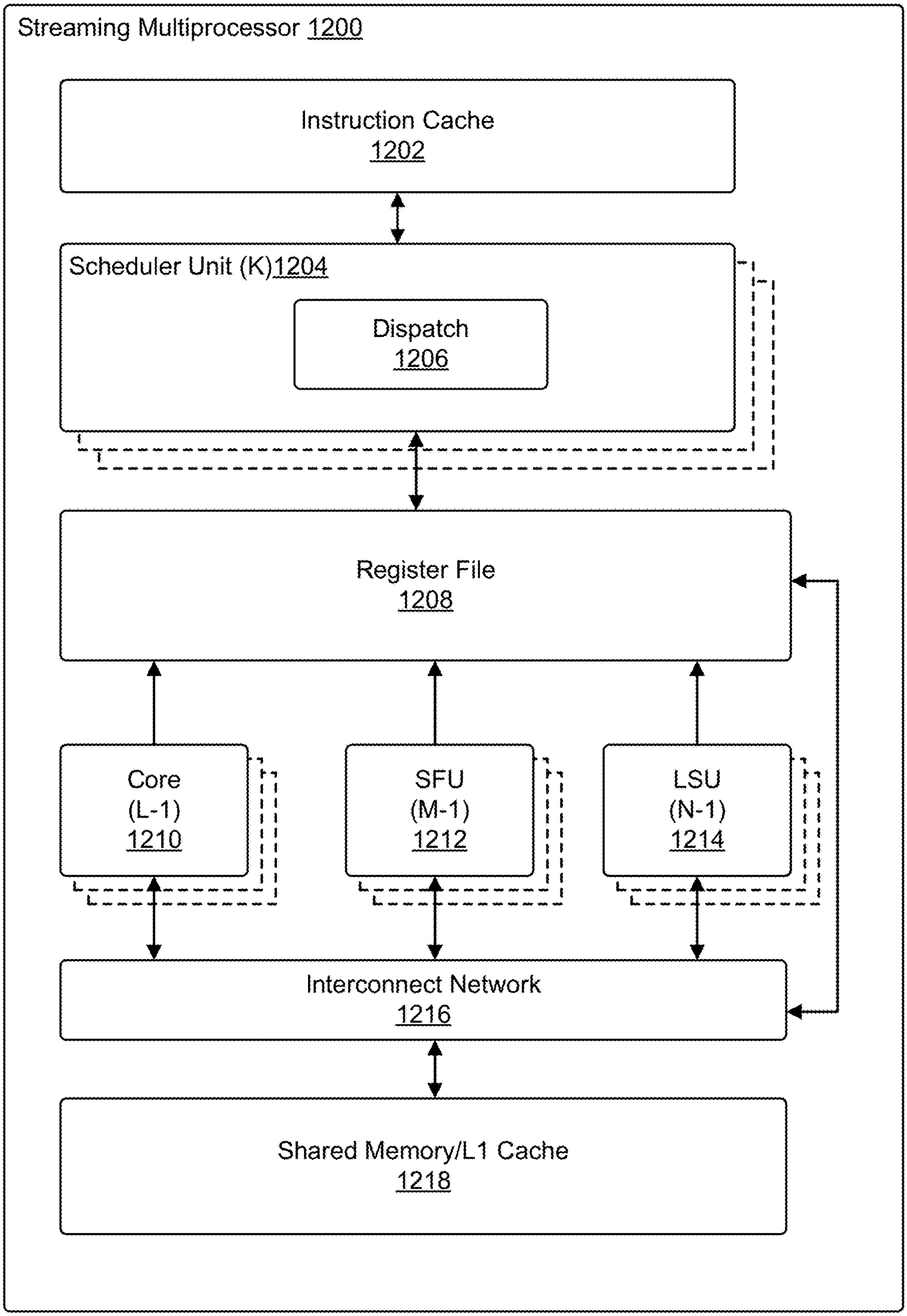
FIG. 12 illustrates an example of a streaming multi-processor, in accordance with one embodiment.

FIG. 12 illustrates a streaming multi-processor such as the streaming multi-processor of FIG. 10, in accordance with one embodiment. In an embodiment, the SM 1200 includes: an instruction cache 1202; one or more scheduler units 1204; a register file 1208; one or more processing cores 1210; one or more special function units ("SFUs") 1212; one or more load/store units ("LSUs") 1214; an interconnect network 1216; a shared memory/L1 cache 1218; and any suitable combination thereof. In an embodiment, the work distribution unit dispatches tasks for execution on the GPCs of the PPU and each task is allocated to a particular DPC within a GPC and, if the task is associated with a shader program, the task is allocated to an SM 1200. In an embodiment, the scheduler unit 1204 receives the tasks from the work distribution unit and manages instruction scheduling for one or more thread blocks assigned to the SM 1200. In an embodiment, the scheduler unit 1204 schedules thread blocks for execution as warps of parallel threads, wherein each thread block is allocated at least one warp. In an embodiment, each warp executes threads. In an embodiment, the scheduler unit 1204 manages a plurality of different thread blocks, allocating the warps to the different thread blocks and then dispatching instructions from the plurality of different cooperative groups to the various functional units (e.g., cores 1210, SFUs 1212, and LSUs 1214) during each clock cycle.

Cooperative Groups may refer to a programming model for organizing groups of communicating threads that allows developers to express the granularity at which threads are communicating, enabling the expression of richer, more efficient parallel decompositions. In an embodiment, cooperative launch APIs support synchronization amongst thread blocks for the execution of parallel algorithms. In an embodiment, applications of conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces. Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

In an embodiment, a dispatch unit 1206 is configured to transmit instructions to one or more of the functional units and the scheduler unit 1204 includes two dispatch units 1206 that enable two different instructions from the same warp to be dispatched during each clock cycle. In an embodiment, each scheduler unit 1204 includes a single dispatch unit 1206 or additional dispatch units 1206.

Each SM 1200, in an embodiment, includes a register file 1208 that provides a set of registers for the functional units of the SM 1200. In an embodiment, the register file 1208 is divided between each of the functional units such that each functional unit is allocated a dedicated portion of the register file 1208. In an embodiment, the register file 1208 is divided between the different warps being executed by the SM 1200 and the register file 1208 provides temporary storage for operands connected to the data paths of the functional units. In an embodiment, each SM 1200 comprises a plurality of L processing cores 1210. In an embodiment, the SM 1200 includes a large number (e.g., 128 or more) of distinct processing cores 1210. Each core 1210, in an embodiment, includes a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 1210 include 64 single-precision (32-bit) floating point cores, 64 integer cores, 32 double-precision (64-bit) floating point cores, and 8 tensor cores.

Tensor cores are configured to perform matrix operations in accordance with an embodiment. In an embodiment, one or more tensor cores are included in the cores 1210. In an embodiment, the tensor cores are configured to perform deep learning matrix arithmetic, such as convolution operations for neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B are 16-bit floating point matrices and the accumulation matrices C and D are 16-bit floating point or 32-bit floating point matrices. In an embodiment, the tensor cores operate on 16-bit floating point input data with 32-bit floating point accumulation. In an embodiment, the 16-bit floating point multiply requires 64 operations and results in a full precision product that is then accumulated using 32-bit floating point addition with the other intermediate products for a 4×4×4 matrix multiply. Tensor cores are used to perform much larger two-dimensional or higher dimensional matrix operations, built up from these smaller elements, in an embodiment. In an embodiment, an API, such as CUDA 9 C++ API, exposes specialized matrix load, matrix multiply and accumulate, and matrix store operations to efficiently use tensor cores from a CUDA-C++ program. In an embodiment, at the CUDA level, the warp-level interface assumes 16×16 size matrices spanning all 32 threads of the warp.

In an embodiment, each SM 1200 comprises M SFUs 1212 that perform special functions (e.g., attribute evaluation, reciprocal square root, and the like). In an embodiment, the SFUs 1212 include a tree traversal unit configured to traverse a hierarchical tree data structure. In an embodiment, the SFUs 1212 include texture unit configured to perform texture map filtering operations. In an embodiment, the texture units are configured to load texture maps (e.g., a 2D array of texels) from the memory and sample the texture maps to produce sampled texture values for use in shader programs executed by the SM 1200. In an embodiment, the texture maps are stored in the shared memory/L1 cache. The texture units implement texture operations such as filtering operations using mip-maps (e.g., texture maps of varying levels of detail), in accordance with one embodiment. In an embodiment, each SM 1200 includes two texture units.

Each SM 1200 comprises N LSUs 1154 that implement load and store operations between the shared memory/L1 cache 1106 and the register file 1208, in an embodiment. Each SM 1200 includes an interconnect network 1216 that connects each of the functional units to the register file 1208 and the LSU 1214 to the register file 1208, shared memory/L1 cache 1218 in an embodiment. In an embodiment, the interconnect network 1216 is a crossbar that can be configured to connect any of the functional units to any of the registers in the register file 1208 and connect the LSUs 1214 to the register file and memory locations in shared memory/L1 cache 1218.

The shared memory/L1 cache 1218 is an array of on-chip memory that allows for data storage and communication between the SM 1200 and the primitive engine and between threads in the SM 1200 in an embodiment. In an embodiment, the shared memory/L1 cache 1218 comprises 128 KB of storage capacity and is in the path from the SM 1200 to the partition unit. The shared memory/L1 cache 1218, in an embodiment, is used to cache reads and writes. One or more of the shared memory/L1 cache 1218, L2 cache, and memory are backing stores.

Combining data cache and shared memory functionality into a single memory block provides improved performance for both types of memory accesses, in an embodiment. The capacity, in an embodiment, is used or is usable as a cache by programs that do not use shared memory, such as if shared memory is configured to use half of the capacity, texture and load/store operations can use the remaining capacity. Integration within the shared memory/L1 cache 1218 enables the shared memory/L1 cache 1218 to function as a high-throughput conduit for streaming data while simultaneously providing high-bandwidth and low-latency access to frequently reused data, in accordance with an embodiment. When configured for general purpose parallel computation, a simpler configuration can be used compared with graphics processing. In an embodiment, fixed function graphics processing units are bypassed, creating a much simpler programming model. In the general purpose parallel computation configuration, the work distribution unit assigns and distributes blocks of threads directly to the DPCs, in an embodiment. The threads in a block execute the same program, using a unique thread ID in the calculation to ensure each thread generates unique results, using the SM 1200 to execute the program and perform calculations, shared memory/L1 cache 1218 to communicate between threads, and the LSU 1214 to read and write global memory through the shared memory/L1 cache 1218 and the memory partition unit, in accordance with one embodiment. In an embodiment, when configured for general purpose parallel computation, the SM 1200 writes commands that the scheduler unit can use to launch new work on the DPCs.

In an embodiment, the PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In an embodiment, the PPU is embodied on a single semiconductor substrate. In an embodiment, the PPU is included in a system-on-a-chip ("SoC") along with one or more other devices such as additional PPUs, the memory, a reduced instruction set computer ("RISC") CPU, a memory management unit ("MMU"), a digital-to-analog converter ("DAC"), and the like.

In an embodiment, the PPU may be included on a graphics card that includes one or more memory devices. The graphics card may be configured to interface with a PCIe slot on a motherboard of a desktop computer. In yet another embodiment, the PPU may be an integrate graphics processing unit ("iGPU") included in the chipset of the motherboard.

Figure 13:
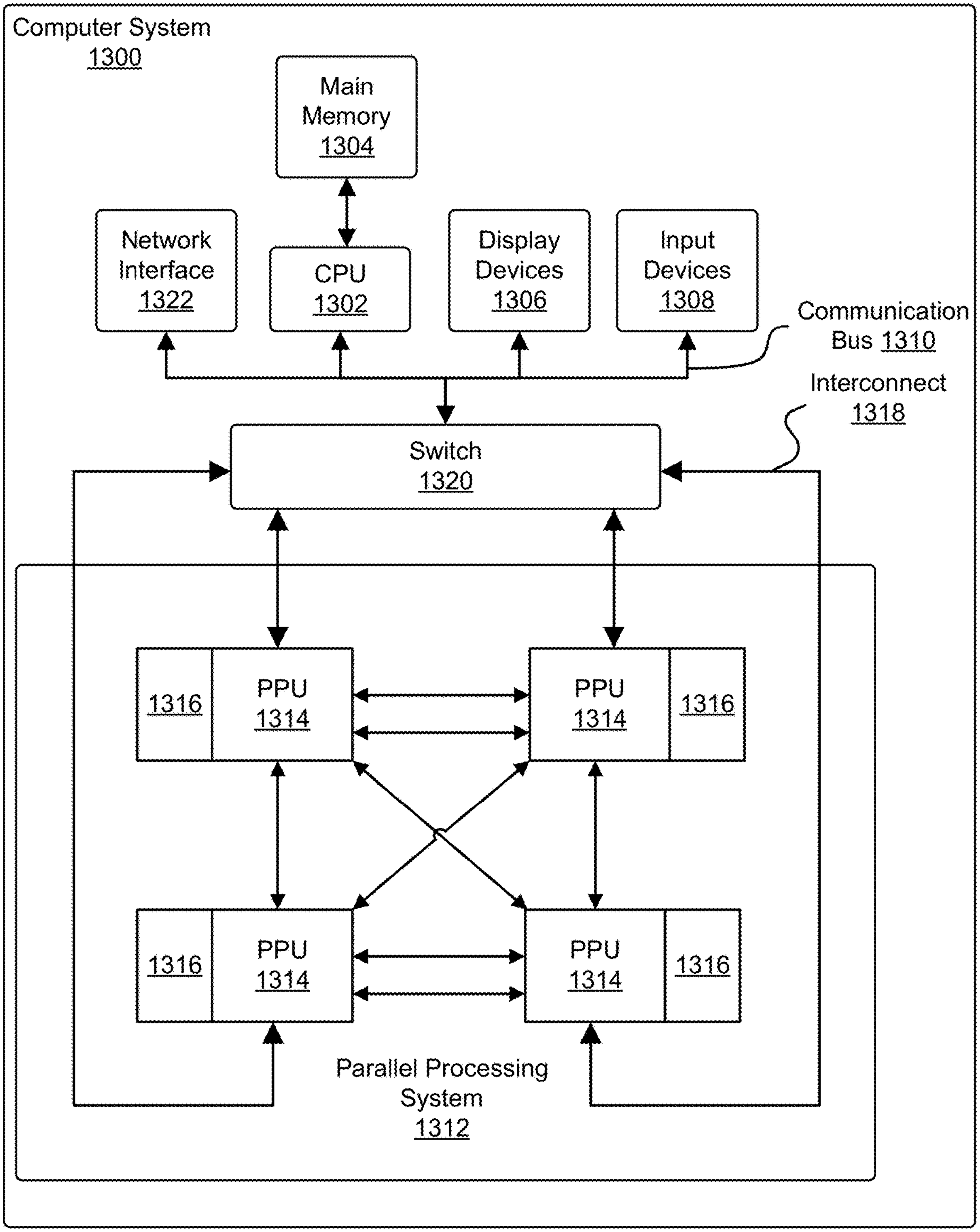
FIG. 13 illustrates a computer system in which the various examples can be implemented, in accordance with one embodiment.

FIG. 13 illustrates a computer system 1300 in which the various architecture and/or functionality can be implemented, in accordance with one embodiment. The computer system 1300, in an embodiment, is configured to implement various processes and methods described throughout this disclosure.

In an embodiment, the computer system 1300 comprises at least one central processing unit 1302 that is connected to a communication bus 1310 implemented using any suitable protocol, such as PCI (Peripheral Component Interconnect), PCI-Express, AGP (Accelerated Graphics Port), HyperTransport, or any other bus or point-to-point communication protocol(s). In an embodiment, the computer system 1300 includes a main memory 1304 and control logic (e.g., implemented as hardware, software, or a combination thereof) and data are stored in the main memory 1304 which may take the form of random access memory ("RAM"). In an embodiment, a network interface subsystem 1322 provides an interface to other computing devices and networks for receiving data from and transmitting data to other systems from the computer system 1300.

The computer system 1300, in an embodiment, includes input devices 1308, the parallel processing system 1312, and display devices 1306 which can be implemented using a conventional CRT (cathode ray tube), LCD (liquid crystal display), LED (light emitting diode), plasma display, or other suitable display technologies. In an embodiment, user input is received from input devices 1308 such as keyboard, mouse, touchpad, microphone, and more. In an embodiment, each of the foregoing modules can be situated on a single semiconductor platform to form a processing system.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit ("CPU") and bus implementation. Of course, the various modules may also be situated separately or in various combinations of semiconductor platforms per the desires of the user.

In an embodiment, computer programs in the form of machine-readable executable code or computer control logic algorithms are stored in the main memory 1304 and/or secondary storage. Computer programs, if executed by one or more processors, enable the system 1300 to perform various functions in accordance with one embodiment. The memory 1304, the storage, and/or any other storage are possible examples of computer-readable media. Secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory.

In an embodiment, the architecture and/or functionality of the various previous figures are implemented in the context of the central processor 1302; parallel processing system 1312; an integrated circuit capable of at least a portion of the capabilities of both the central processor 1302; the parallel processing system 1312; a chipset (e.g., a group of integrated circuits designed to work and sold as a unit for performing related functions, etc.); and any suitable combination of integrated circuit.

In an embodiment, the architecture and/or functionality of the various previous figures is be implemented in the context of a general computer system, a circuit board system, a game console system dedicated for entertainment purposes, an application-specific system, and more. In an embodiment, the computer system 1300 may take the form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In an embodiment, a parallel processing system 1312 includes a plurality of PPUs 1314 and associated memories 1316. In an embodiment, the PPUs are connected to a host processor or other peripheral devices via an interconnect 1318 and a switch 1320 or multiplexer. In an embodiment, the parallel processing system 1312 distributes computational tasks across the PPUs 1314 which can be parallelizable for example, as part of the distribution of computational tasks across multiple GPU thread blocks. In an embodiment, memory is shared and accessible (e.g., for read and/or write access) across some or all of the PPUs 1314, although such shared memory may incur performance penalties relative to the use of local memory and registers resident to a PPU. In an embodiment, the operation of the PPUs 1314 is synchronized through the use of a command such as _syncthreads( ) which requires all threads in a block (e.g., executed across multiple PPUs 1314) to reach a certain point of execution of code before proceeding.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer system comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the description and claims, the terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered a system.

In the present document, references may be made to obtaining, acquiring, receiving, or inputting analog or digital data into a subsystem, computer system, or computer-implemented machine. The process of obtaining, acquiring, receiving, or inputting analog and digital data can be accomplished in a variety of ways such as by receiving the data as a parameter of a function call or a call to an application programming interface. In some implementations, the process of obtaining, acquiring, receiving, or inputting analog or digital data can be accomplished by transferring the data via a serial or parallel interface. In another implementation, the process of obtaining, acquiring, receiving, or inputting analog or digital data can be accomplished by transferring the data via a computer network from the providing entity to the acquiring entity. References may also be made to providing, outputting, transmitting, sending, or presenting analog or digital data. In various examples, the process of providing, outputting, transmitting, sending, or presenting analog or digital data can be accomplished by transferring the data as an input or output parameter of a function call, a parameter of an application programming interface or interprocess communication mechanism.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:

identifying a first range of values input to a first path of one or more neural networks;

identifying a second range of values input to a second path of the one or more neural networks;

selecting, based at least in part on the first range of values and the second range of values, a set of quantization parameters to be used by both of the first path of the one or more neural networks, and the second path of the one or more neural networks; and computing output of the first path of the one or more neural networks and the second path of the one or more neural networks based, at least in part, on the selected set of quantization parameters.

2. The computer-implemented method of claim 1, further comprising adjusting the selected set of quantization parameters based, at least in part, on variation in the first and the second ranges of values.

3. The computer-implemented method of claim 1, further comprising normalizing the first range of values and the second range of values.

4. The computer-implemented method of claim 1, further comprising using a machine learning model to determine one or more quantization ranges to use as one or more of the selected set of quantization parameters.

5. The computer-implemented method of claim 1, further comprising determining whether outputs of the first path and the second path are compatible with a third path of the one or more neural networks.

6. The computer-implemented method of claim 1, further comprising concatenating output of one or more paths of the one or more neural networks with one or more other paths.

7. A system, comprising:
one or more processors to respond to one or more application programming interface (API) calls by at least causing a parallel processing unit to:
identify a first range of values to be input to a first path of one or more neural networks and a second range of values to be input to a second path of the one or more neural networks;
determine, based at least in part on the first range of values and the second range of values, a set of quantization parameters to be shared between the first path of the one or more neural networks and the second path of the one or more neural networks; and
cause output of the first path of the one or more neural networks and the second path of the one or more neural networks to both be computed using the shared set of quantization parameters.

8. The system of claim 7, wherein the system adjusts the shared set of quantization parameters based, at least in part, on variations in the first range of values and the second range of values.

9. The system of claim 7, wherein the system normalizes values of the first and the second ranges of values.

10. The system of claim 7, wherein the system determines the shared set of quantization parameters using a machine learning model whose output comprises one or more quantization ranges.

11. The system of claim 7, wherein the system quantizes outputs within portions of at least one of the first path or the second path using the shared set of quantization parameters.

12. The system of claim 7, wherein the set of quantization parameters comprise ranges and resolutions of integer values.

13. One or more processors, comprising:
circuitry to:
identify a first range of values input to a first path of one or more neural networks;
identify a second range of values input to a second path of the one or more neural networks;
select, based at least in part on the first range of values and the second range of values, a set of quantization parameters to be shared between the first path of the one or more neural networks and the second path of the one or more neural networks; and
cause output of the first path of the one or more neural networks and the second path of the one or more neural networks to both be computed using the selected shared set of quantization parameters.

14. The one or more processors of claim 13, wherein the circuitry is further to select the shared set of quantization parameters based, at least in part, on variations in the first range of values and the second range of values.

15. The one or more processors of claim 13, wherein the circuitry is further to perform normalization on the first range of values and the second range of values prior to selecting the set of quantization parameters to be shared.

16. The one or more processors of claim 13, wherein the circuitry is further to select the shared set of quantization parameters using a machine learning model whose output comprises one or more quantization ranges for one or more neural network paths.

17. The one or more processors of claim 13, wherein the circuitry is further to select the shared set of quantization parameters based, at least in part, on whether outputs of the first path and the second path are compatible with a third path of the one or more neural networks.

18. The one or more processors of claim 13, wherein the circuitry is to concatenate output of one or more paths of the one or more neural networks with output of one or more other paths of the one or more neural networks.

19. The one or more processors of claim 13, wherein an application programming interface (API) is to schedule operations on a parallel processing unit ("PPU") to compute output of the first path of the one or more neural networks and the second path of the one or more neural networks.

20. The one or more processors of claim 13, wherein the set of quantization parameters comprises a range and resolution applied to integer values.

* * * * *